United States Patent
Faries, Jr. et al.

(10) Patent No.: US 6,566,631 B2
(45) Date of Patent: May 20, 2003

(54) METHOD AND APPARATUS FOR MONITORING TEMPERATURE OF INTRAVENOUSLY DELIVERED FLUIDS AND OTHER MEDICAL ITEMS

(75) Inventors: Durward I. Faries, Jr., McLean, VA (US); Bruce R. Heymann, Vienna, VA (US); Calvin Blankenship, Centreville, VA (US)

(73) Assignee: Medical Solutions, Inc., Chantilly, VA (US)

( * ) Notice: Subject to any disclaimer, the term of this patent is extended or adjusted under 35 U.S.C. 154(b) by 0 days.

(21) Appl. No.: 09/983,179

(22) Filed: Oct. 23, 2001

(65) Prior Publication Data

US 2002/0021741 A1 Feb. 21, 2002

Related U.S. Application Data

(62) Division of application No. 09/539,183, filed on Mar. 30, 2000.
(60) Provisional application No. 60/126,874, filed on Mar. 30, 1999.

(51) Int. Cl.$^7$ .............................. A61F 7/00; F27D 19/00
(52) U.S. Cl. ..................... 219/428; 219/386; 219/412; 219/413; 219/394
(58) Field of Search .................................. 219/428, 394, 219/386, 412, 413; 374/141, 150; 392/443, 470

(56) References Cited

U.S. PATENT DOCUMENTS

| | | |
|---|---|---|
| 522,866 A | 7/1894 | Weinhagen et al. |
| 558,979 A | 4/1896 | Noble |

(List continued on next page.)

FOREIGN PATENT DOCUMENTS

| | | |
|---|---|---|
| DE | 37 42 927 | 7/1989 |
| DE | 197 52578 | 6/1999 |

(List continued on next page.)

OTHER PUBLICATIONS

Health Devices, vol. 25, No. 10, Oct. 1996.
Minco Products, Inc., Bulletin CT 198, 1996.

(List continued on next page.)

*Primary Examiner*—Joseph Pelham

(57) ABSTRACT

An intravenous solution bag includes a temperature sensing device in the form of a temperature sensing strip. The strip includes a temperature scale and corresponding temperature sensitive substances that change color or illuminate the scale indicators to visually indicate solution temperature. The strip may be formed integral with the bag, may be attached to the bag exterior surface, may be laminated to the bag exterior surface or may be encased with the bag within a solution bag liner. Further, the temperature sensing strip may be affixed to bottles containing intravenous or other solutions, where the strip is attached to the bottle exterior surface or to a label affixed to the bottle to measure and indicate temperature of fluid contained therein as described above. Moreover, the temperature sensing strip may be employed by a receptacle or delivery tube of an infusion apparatus to measure and indicate solution temperature prior to or during infusion. In addition, the temperature sensing strip may be disposed within thermal treatment system compartments to measure and provide a visual indication of medical item temperatures. Alternatively, the strip may be employed by a stand, plate, receptacle or other structure receiving a medical item or container to provide a temperature measurement and indication as described above. The structure may be a stand-alone unit or may be attached to a thermal treatment or other system to facilitate temperature measurement.

3 Claims, 11 Drawing Sheets

U.S. PATENT DOCUMENTS

| | | |
|---|---|---|
| 675,647 A | 6/1901 | Andersen et al. |
| 785,524 A | 3/1905 | Shea |
| 803,352 A | 10/1905 | Meyer |
| 1,062,111 A | 5/1913 | Nylander |
| 1,092,643 A | 4/1914 | Goolsby |
| 1,110,919 A | 9/1914 | Gamble |
| 1,223,274 A | 4/1917 | Hallock |
| 1,390,500 A | 9/1921 | Christian |
| 1,493,450 A | 5/1924 | Richardson |
| 1,659,719 A | 2/1928 | Blake |
| 1,726,212 A | 8/1929 | Bucky |
| 1,770,832 A | 7/1930 | Bass |
| 1,794,215 A | 2/1931 | Titus |
| 1,838,026 A | 12/1931 | Williams |
| 1,847,954 A | 3/1932 | Fisher |
| 1,960,417 A | 5/1934 | Pain, Jr. |
| 1,982,213 A | 11/1934 | Hopkins |
| 1,987,119 A | 1/1935 | Long |
| 1,995,302 A | 3/1935 | Goldstein |
| 2,063,902 A | 12/1936 | Beasley |
| 2,087,586 A | 7/1937 | Tishman |
| 2,124,293 A | 7/1938 | Goldstein |
| 2,175,099 A | 10/1939 | Abbott |
| 2,204,764 A | 6/1940 | Mayo |
| 2,214,215 A | 9/1940 | Watermann et al. |
| 2,254,994 A | 9/1941 | Butland |
| 2,357,692 A | 9/1944 | Saffady |
| 2,470,481 A | 5/1949 | Freeman |
| 2,576,874 A | 11/1951 | Acton |
| 2,713,112 A | 7/1955 | Mills et al. |
| 2,741,099 A | 4/1956 | Beane |
| 2,766,907 A | 10/1956 | Wallace, Jr. |
| 2,841,132 A | 7/1958 | Philipp |
| 2,885,526 A | 5/1959 | Paulding |
| 2,910,981 A | 11/1959 | Wilson et al. |
| 2,994,760 A | 8/1961 | Pecoraro et al. |
| 3,051,582 A | 8/1962 | Muckler et al. |
| 3,140,716 A | 7/1964 | Harrison et al. |
| 3,193,339 A | 7/1965 | Cooper |
| 3,241,603 A | 3/1966 | Nagata |
| 3,247,851 A | 4/1966 | Seibert |
| 3,255,812 A | 6/1966 | Bayane et al. |
| 3,329,202 A | 7/1967 | Birman |
| 3,353,589 A | 11/1967 | Tope et al. |
| 3,370,153 A | 2/1968 | Du Fresne et al. |
| 3,386,498 A | 6/1968 | Funfstuck |
| 3,475,590 A | 10/1969 | Pins |
| 3,485,245 A | 12/1969 | Lahr et al. |
| 3,536,132 A | 10/1970 | Pecoraro et al. |
| 3,551,641 A | 12/1970 | Truhan |
| 3,590,215 A | 6/1971 | Anderson et al. |
| 3,612,059 A | 10/1971 | Ersek |
| 3,612,165 A | 10/1971 | Haynes |
| 3,614,385 A | 10/1971 | Horstmann |
| 3,629,552 A | 12/1971 | Edging |
| 3,640,277 A | 2/1972 | Adelberg |
| 3,651,695 A | 3/1972 | Brown |
| 3,704,625 A | 12/1972 | Seto et al. |
| 3,713,302 A | 1/1973 | Reviel |
| 3,777,187 A | 12/1973 | Kohn |
| 3,826,305 A | 7/1974 | Fishman |
| 3,858,106 A | 12/1974 | Launius |
| 3,861,213 A | 1/1975 | Parker |
| 3,864,976 A * | 2/1975 | Parker ................. 374/150 |
| 3,879,171 A * | 4/1975 | Tulis ................... 219/521 |
| 3,895,741 A | 7/1975 | Nugent |
| 3,908,652 A | 9/1975 | Weissinger |
| 4,024,377 A | 5/1977 | Henke |
| 4,038,519 A | 7/1977 | Foucras |
| 4,084,080 A | 4/1978 | McMahan |
| 4,090,514 A | 5/1978 | Hinck et al. |
| 4,167,663 A | 9/1979 | Granzow, Jr. et al. |
| 4,189,995 A | 2/1980 | Löhr et al. |
| 4,233,495 A | 11/1980 | Scoville et al. |
| 4,293,762 A | 10/1981 | Ogawa |
| 4,309,592 A | 1/1982 | Le Boeuf |
| 4,318,276 A | 3/1982 | Sato et al. |
| 4,328,676 A | 5/1982 | Reed |
| 4,331,859 A | 5/1982 | Thomas et al. |
| 4,356,383 A | 10/1982 | Dahlberg |
| 4,364,234 A | 12/1982 | Reed |
| 4,375,813 A | 3/1983 | Hessel |
| 4,384,578 A | 5/1983 | Winkler |
| 4,407,133 A | 10/1983 | Edmonson |
| 4,408,905 A | 10/1983 | Ehrenkranz |
| 4,419,568 A | 12/1983 | VanOverloop |
| 4,430,078 A | 2/1984 | Sprague |
| 4,448,204 A | 5/1984 | Lichtenstein |
| 4,455,478 A | 6/1984 | Guibert |
| 4,464,563 A | 8/1984 | Jewett |
| 4,468,137 A | 8/1984 | Hilsum et al. |
| 4,490,884 A | 1/1985 | Vickers |
| 4,495,402 A | 1/1985 | Burdick et al. |
| 4,509,532 A | 4/1985 | DeVries |
| 4,523,078 A | 6/1985 | Lehmann |
| 4,531,941 A | 7/1985 | Zasuwa |
| 4,532,414 A | 7/1985 | Shah et al. |
| 4,551,136 A | 11/1985 | Mandl |
| 4,605,840 A | 8/1986 | Koopman |
| 4,613,327 A | 9/1986 | Tegarian et al. |
| 4,614,514 A | 9/1986 | Carr et al. |
| 4,626,243 A | 12/1986 | Singh et al. |
| 4,651,813 A | 3/1987 | Witt et al. |
| 4,657,004 A | 4/1987 | Coffey |
| 4,678,460 A | 7/1987 | Rosner |
| 4,680,445 A | 7/1987 | Ogawa |
| 4,682,979 A | 7/1987 | Girouard |
| 4,684,367 A | 8/1987 | Schaffer et al. |
| 4,705,505 A | 11/1987 | Fried |
| 4,707,587 A | 11/1987 | Greenblatt |
| 4,709,135 A | 11/1987 | Dietrich et al. |
| 4,726,193 A | 2/1988 | Burke et al. |
| 4,735,609 A | 4/1988 | Comeau et al. |
| 4,745,248 A | 5/1988 | Hayes |
| 4,747,826 A | 5/1988 | Sassano |
| 4,756,299 A | 7/1988 | Podella |
| 4,759,749 A | 7/1988 | Verkaart |
| 4,772,778 A | 9/1988 | Ogawa |
| 4,781,548 A | 11/1988 | Alderson et al. |
| 4,782,212 A | 11/1988 | Bakke |
| 4,801,777 A | 1/1989 | Auerbach |
| 4,804,367 A | 2/1989 | Smith et al. |
| 4,808,159 A | 2/1989 | Wilson |
| 4,823,554 A | 4/1989 | Trachtenberg et al. |
| 4,832,689 A | 5/1989 | Mauerer et al. |
| 4,844,074 A | 7/1989 | Kurucz |
| 4,847,470 A | 7/1989 | Bakke |
| 4,859,360 A | 8/1989 | Suzuki et al. |
| 4,874,033 A | 10/1989 | Chatelain et al. |
| 4,874,359 A | 10/1989 | White et al. |
| 4,878,537 A | 11/1989 | Verkaart |
| 4,878,588 A * | 11/1989 | Ephraim ................. 374/150 |
| 4,894,207 A | 1/1990 | Archer et al. |
| 4,900,308 A | 2/1990 | Verkaart |
| 4,906,816 A | 3/1990 | Van Leerdam |
| 4,910,386 A | 3/1990 | Johnson |
| 4,916,386 A | 4/1990 | Schulz |
| 4,934,336 A | 6/1990 | White |
| 4,935,604 A | 6/1990 | Allen et al. |
| 4,961,320 A | 10/1990 | Gutmann |
| 5,000,581 A | 3/1991 | Yata et al. |

| Patent | Date | Inventor |
|---|---|---|
| 5,013,889 A | 5/1991 | Bakke |
| 5,019,047 A | 5/1991 | Kriesel |
| 5,042,455 A | 8/1991 | Yue et al. |
| 5,059,182 A | 10/1991 | Laing |
| 5,061,241 A | 10/1991 | Stephens, Jr. et al. |
| 5,061,630 A | 10/1991 | Knopf et al. |
| 5,063,994 A | 11/1991 | Verkaart |
| 5,075,167 A | 12/1991 | Yamauchi et al. |
| 5,081,697 A | 1/1992 | Manella |
| 5,096,822 A | 3/1992 | Rosenkrans, Jr. et al. |
| 5,097,898 A | 3/1992 | Verkaart |
| 5,106,373 A | 4/1992 | Augustine et al. |
| 5,108,372 A | 4/1992 | Swenson |
| 5,125,069 A | 6/1992 | O'Boyle |
| 5,125,900 A | 6/1992 | Teves |
| 5,129,033 A | 7/1992 | Ferrara et al. |
| 5,169,389 A | 12/1992 | Kriesel |
| 5,180,896 A | 1/1993 | Gibby et al. |
| 5,183,994 A | 2/1993 | Bowles, Sr. et al. |
| 5,184,613 A | 2/1993 | Mintz |
| 5,195,976 A | 3/1993 | Swenson |
| 5,205,820 A | 4/1993 | Kriesel |
| 5,211,631 A | 5/1993 | Sheaff |
| 5,217,064 A | 6/1993 | Kellow et al. |
| 5,232,439 A | 8/1993 | Campbell et al. |
| 5,241,951 A | 9/1993 | Mason et al. |
| 5,243,833 A | 9/1993 | Coelho et al. |
| 5,245,693 A | 9/1993 | Ford et al. |
| 5,250,032 A | 10/1993 | Carter, Jr. et al. |
| 5,254,094 A | 10/1993 | Starkey et al. |
| 5,261,411 A | 11/1993 | Hughes |
| 5,261,875 A | 11/1993 | Spears et al. |
| 5,263,323 A | 11/1993 | Maus et al. |
| 5,263,929 A | 11/1993 | Falcone et al. |
| 5,276,310 A | 1/1994 | Schmidt et al. |
| 5,279,558 A | 1/1994 | Kriesel |
| 5,279,598 A | 1/1994 | Sheaff |
| 5,282,264 A | 1/1994 | Reeves et al. |
| 5,282,683 A * | 2/1994 | Brett ............... 219/385 |
| 5,290,230 A | 3/1994 | Ainsworth et al. |
| 5,297,234 A | 3/1994 | Harms et al. |
| 5,308,335 A | 5/1994 | Ross et al. |
| 5,315,830 A | 5/1994 | Doke et al. |
| 5,318,540 A | 6/1994 | Athayde et al. |
| 5,330,431 A | 7/1994 | Herskowitz |
| 5,333,326 A | 8/1994 | Faries, Jr. et al. |
| 5,338,157 A | 8/1994 | Blomquist |
| 5,342,313 A | 8/1994 | Campbell et al. |
| 5,345,923 A | 9/1994 | Luebke et al. |
| 5,348,539 A | 9/1994 | Herskowitz |
| 5,364,385 A | 11/1994 | Harms et al. |
| 5,370,674 A | 12/1994 | Farrell |
| 5,381,510 A | 1/1995 | Ford et al. |
| 5,389,078 A | 2/1995 | Zalesky et al. |
| 5,397,875 A | 3/1995 | Bechtold, Jr. |
| 5,399,007 A | 3/1995 | Marconet |
| 5,399,166 A | 3/1995 | Laing |
| 5,408,576 A | 4/1995 | Bishop |
| 5,408,577 A | 4/1995 | Weber, Jr. et al. |
| 5,411,480 A | 5/1995 | Kriesel |
| 5,411,482 A | 5/1995 | Campbell |
| 5,415,282 A | 5/1995 | Kienholz |
| 5,417,274 A | 5/1995 | Verkaart |
| 5,420,962 A | 5/1995 | Bakke |
| 5,423,759 A | 6/1995 | Campbell |
| 5,433,704 A | 7/1995 | Ross et al. |
| 5,451,209 A | 9/1995 | Ainsworth et al. |
| 5,474,538 A | 12/1995 | Stihler et al. |
| 5,482,373 A | 1/1996 | Hutchinson |
| 5,483,799 A | 1/1996 | Dalto |
| 5,485,408 A | 1/1996 | Blomquist |
| 5,492,534 A | 2/1996 | Athayde et al. |
| 5,512,043 A | 4/1996 | Verkaart |
| 5,514,095 A | 5/1996 | Brightbill et al. |
| 5,523,055 A | 6/1996 | Hansen et al. |
| 5,531,697 A | 7/1996 | Olsen et al. |
| 5,531,698 A | 7/1996 | Olsen |
| 5,538,399 A | 7/1996 | Johnson |
| 5,540,561 A | 7/1996 | Johnson |
| 5,564,915 A | 10/1996 | Johnson |
| 5,567,119 A | 10/1996 | Johnson |
| 5,567,136 A | 10/1996 | Johnson |
| 5,572,873 A | 11/1996 | Lavigne et al. |
| 5,575,563 A | 11/1996 | Chiu et al. |
| 5,584,811 A | 12/1996 | Ross et al. |
| RE35,501 E | 5/1997 | Ross et al. |
| 5,634,426 A | 6/1997 | Tomlinson et al. |
| 5,647,854 A | 7/1997 | Olsen et al. |
| 5,649,910 A | 7/1997 | Kriesel et al. |
| 5,653,905 A | 8/1997 | McKinney |
| 5,658,250 A | 8/1997 | Blomquist et al. |
| 5,658,252 A | 8/1997 | Johnson |
| 5,661,978 A | 9/1997 | Holmes et al. |
| 5,669,877 A | 9/1997 | Blomquist |
| 5,678,925 A | 10/1997 | Garmaise et al. |
| 5,681,284 A | 10/1997 | Herskowitz |
| 5,683,381 A | 11/1997 | Carr et al. |
| 5,690,614 A | 11/1997 | Carr et al. |
| 5,695,473 A | 12/1997 | Olsen |
| 5,707,431 A | 1/1998 | Verkaart et al. |
| 5,713,864 A | 2/1998 | Verkaart |
| 5,729,653 A | 3/1998 | Magliochetti et al. |
| 5,733,263 A | 3/1998 | Wheatman |
| 5,738,442 A | 4/1998 | Paron et al. |
| 5,743,878 A | 4/1998 | Ross et al. |
| 5,755,275 A | 5/1998 | Rose et al. |
| 5,772,409 A | 6/1998 | Johnson |
| 5,779,364 A | 7/1998 | Cannelongo et al. |
| 5,786,568 A | 7/1998 | McKinney |
| 5,788,669 A | 8/1998 | Peterson |
| 5,788,671 A | 8/1998 | Johnson |
| 5,806,528 A | 9/1998 | Magliochetti |
| 5,807,332 A | 9/1998 | Augustine et al. |
| 5,810,771 A | 9/1998 | Blomquist |
| 5,817,146 A * | 10/1998 | Augustine ............... 607/104 |
| 5,823,746 A | 10/1998 | Johnson |
| 5,824,000 A | 10/1998 | Pavlo et al. |
| 5,840,068 A | 11/1998 | Cartledge |
| 5,858,303 A | 1/1999 | Schiffmann et al. |
| 5,876,370 A | 3/1999 | Blomquist |
| 5,879,143 A | 3/1999 | Cote et al. |
| 5,879,329 A | 3/1999 | Ginsburg |
| 5,891,096 A | 4/1999 | Hyun et al. |
| 5,893,843 A | 4/1999 | Rodrigues |
| 5,897,207 A | 4/1999 | Hartmann |
| 5,910,210 A | 6/1999 | Violi et al. |
| 5,919,218 A | 7/1999 | Carr |
| 5,924,289 A | 7/1999 | Bishop, II |
| 5,928,196 A | 7/1999 | Johnson et al. |
| 5,935,099 A | 8/1999 | Peterson et al. |
| 5,935,106 A | 8/1999 | Olsen |
| 5,954,485 A | 9/1999 | Johnson et al. |
| 5,961,492 A | 10/1999 | Kriesel et al. |
| 5,961,700 A | 10/1999 | Oliver |
| 5,977,520 A | 11/1999 | Madson, Jr. et al. |
| 5,986,239 A | 11/1999 | Corrigan, III et al. |
| 5,989,238 A | 11/1999 | Ginsburg |
| 5,997,927 A | 12/1999 | Gics |
| 6,024,539 A | 2/2000 | Blomquist |
| 6,035,102 A | 3/2000 | Bakke |
| 6,062,429 A | 5/2000 | West et al. |
| 6,096,007 A | 8/2000 | Haan et al. |

| | | |
|---|---|---|
| 6,124,572 A | 9/2000 | Spilger et al. |
| 6,129,702 A | 10/2000 | Woias et al. |
| 6,139,528 A | 10/2000 | Kistner et al. |
| 6,142,974 A | 11/2000 | Kristher et al. |
| 6,146,359 A | 11/2000 | Carr et al. |
| 6,164,469 A | 12/2000 | Sartore |
| 6,174,300 B1 | 1/2001 | Kriesel et al. |
| 6,175,099 B1 | 1/2001 | Shei et al. |
| 6,175,688 B1 | 1/2001 | Cassidy et al. |
| 6,221,045 B1 | 4/2001 | Duchon et al. |
| 6,254,572 B1 | 7/2001 | Knipfer et al. |
| 6,257,759 B1 | 7/2001 | Witonsky et al. |
| 6,259,067 B1 | 7/2001 | Faries, Jr. et al. |
| 6,261,261 B1 | 7/2001 | Gordon |
| 6,264,049 B1 * | 7/2001 | Shteynberg ............... 374/150 |
| 6,294,762 B1 | 9/2001 | Faries, Jr. et al. |

FOREIGN PATENT DOCUMENTS

| | | |
|---|---|---|
| EP | 0927552 A1 | 7/1999 |
| GB | 2029677 A | 3/1980 |
| NZ | 331678 A | 3/2000 |
| WO | WO 98/45658 | 10/1998 |
| WO | WO 99/22786 | 5/1999 |
| WO | WO 99/58177 | 11/1999 |

OTHER PUBLICATIONS

Eurotherm Controls, Inc., Model 2116 Temperature Controller, 1997.

Ellenwood, Drop Detector, IBM Technical Bulletin, vol. 12, No. 5, Oct. 1969.

Cbi Medical, Inc., IV Fluid Warmer Model 8362, 1992.

Cahill, New Name, New Helmsman, JEMS, Aug. 1996.

Cbi Healthcare Systems, Inc. Controlled Temperature Cabinet Syste, JEMS, Mar. 17 1997.

Koolatron, P–34 PC–3 Precision Control Thermolectric Cooler/Warmer, Jan. 1998.

Koolatron, Canadian Company announces the release of a precision control unit, Aug. 1997.

Anton, 500 miles from nowhere, it'll give you a cold dring or a warm burger . . . , Technology Update, 1993.

Koolatron, 1997 U.S. $Price List, 1997.

Kellow et al, Drug Adulteration in Prehospital Emergency Medical Services, Oct. 1994.

* cited by examiner

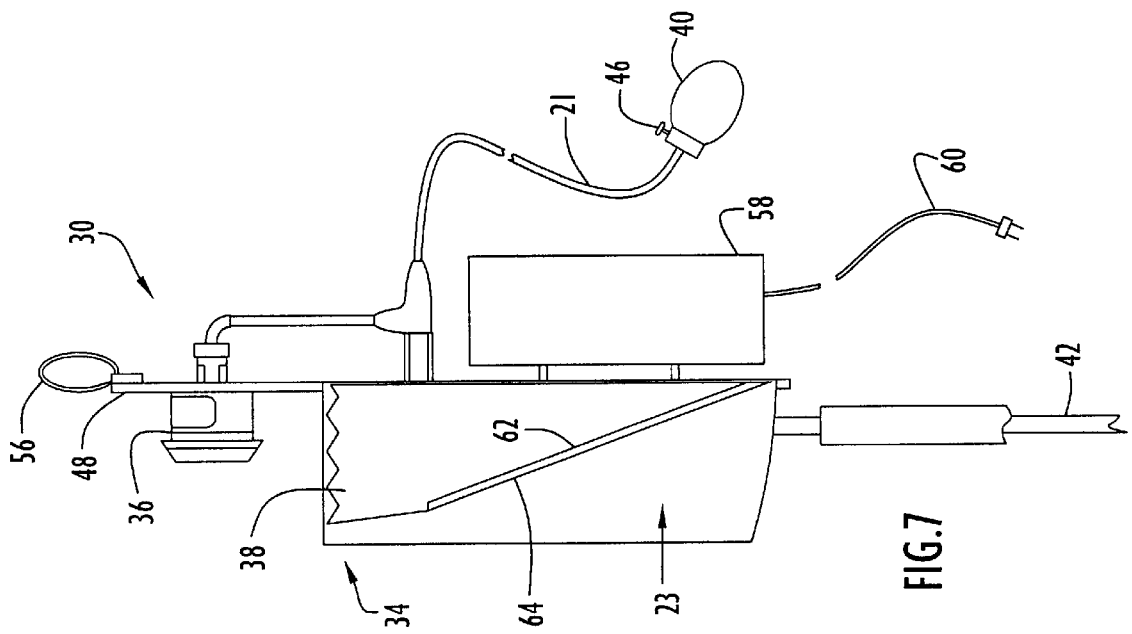
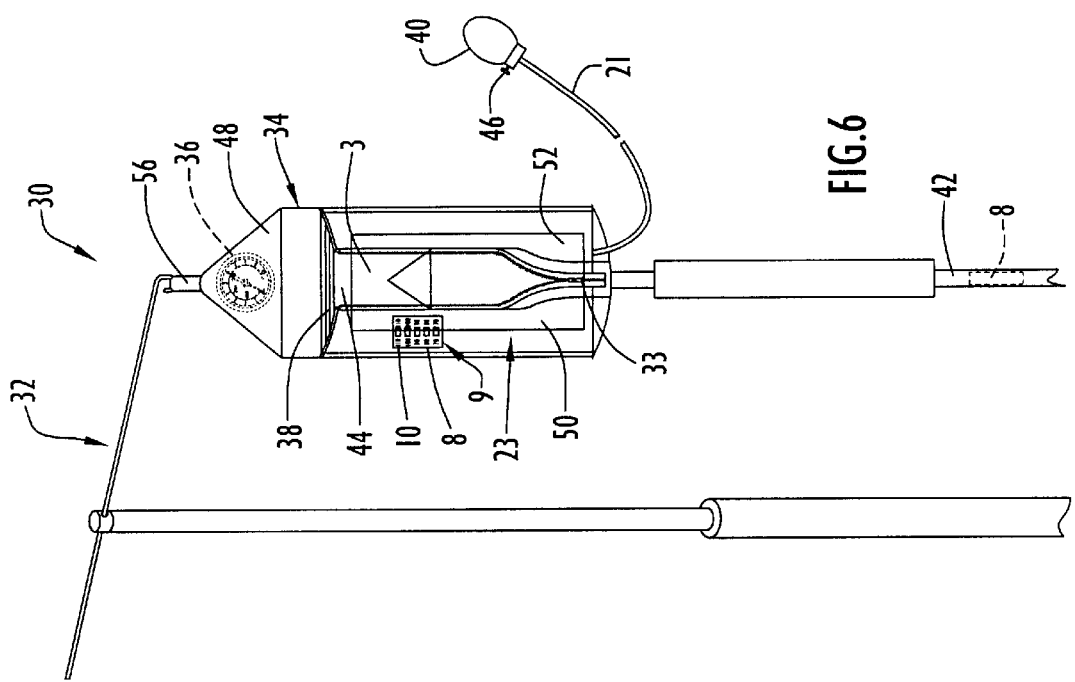

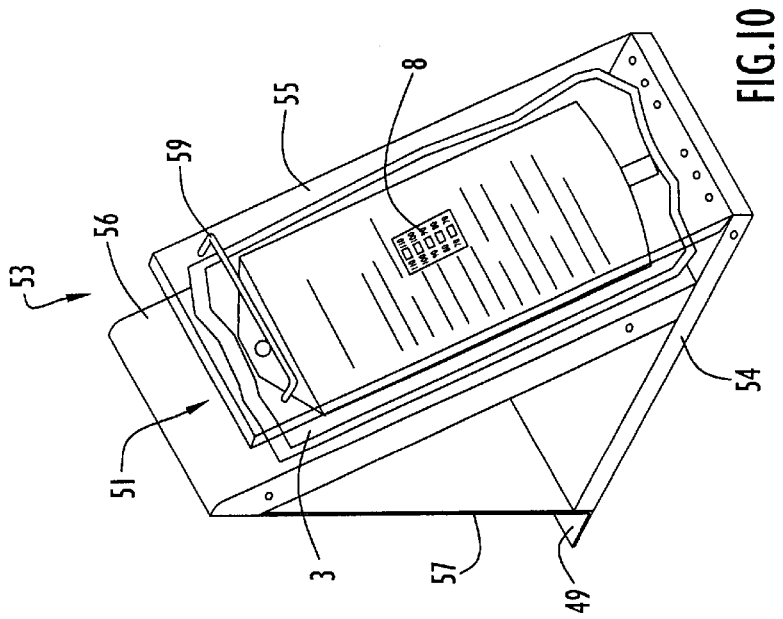
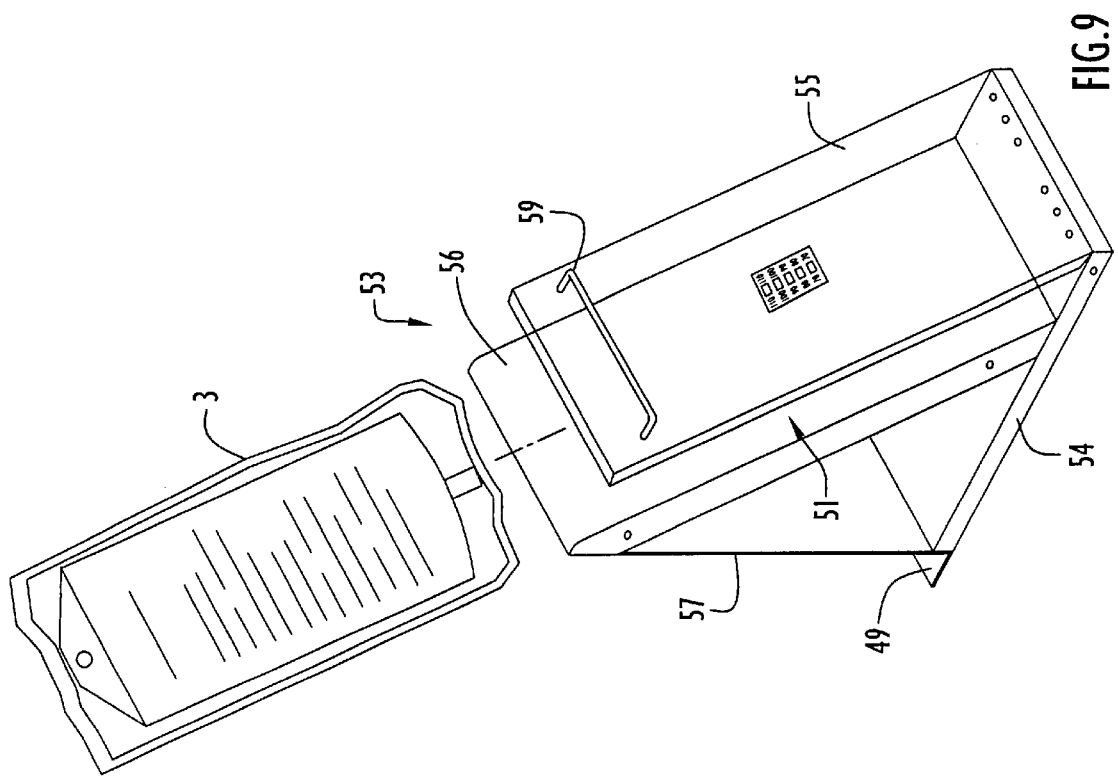

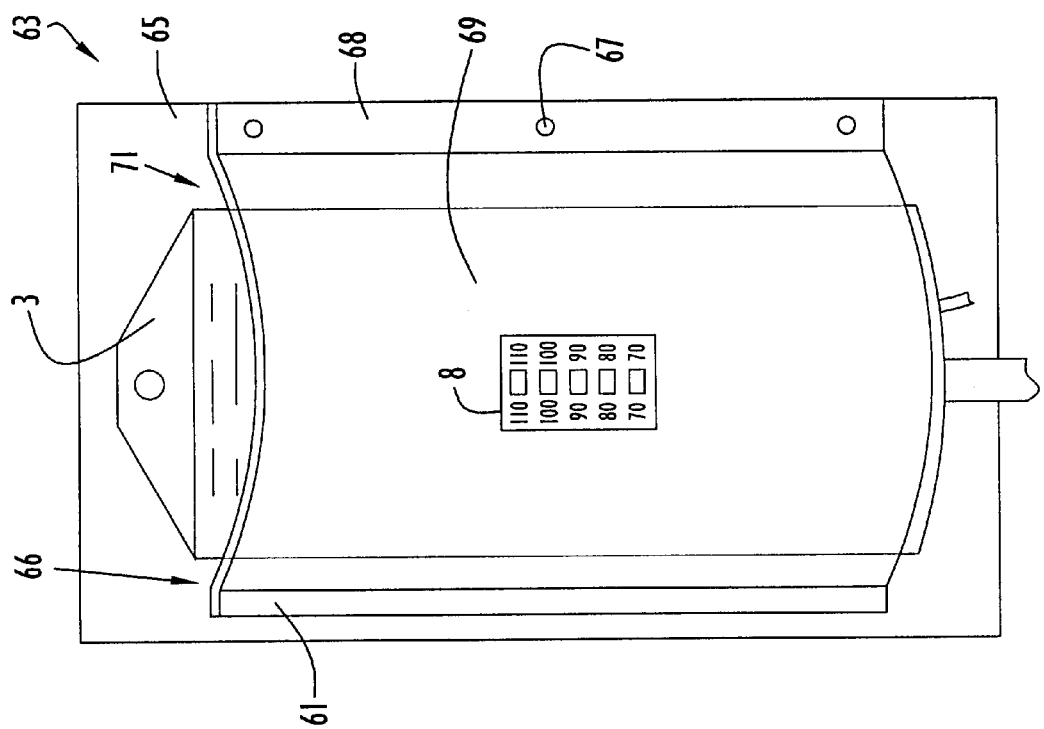
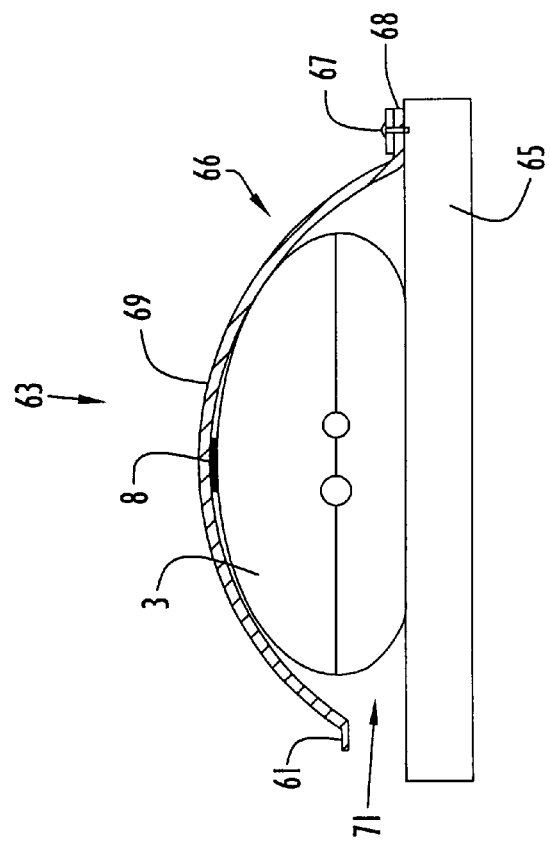

METHOD AND APPARATUS FOR MONITORING TEMPERATURE OF INTRAVENOUSLY DELIVERED FLUIDS AND OTHER MEDICAL ITEMS

CROSS-REFERENCE TO RELATED APPLICATIONS

This application is a divisional of U.S. patent application Ser. No. 09/539,183, entitled "Method and Apparatus for Monitoring Temperature of Intravenously Delivered Fluids and Other Medical Items" and filed on Mar. 30, 2000, which claims priority from U.S. Provisional Patent Application Serial No. 60/126,874, entitled "Method and Apparatus for Monitoring Temperature of Intravenously Delivered Fluids" and filed on Mar. 30, 1999. The disclosures of the above-identified patent applications are incorporated herein by reference in their entireties.

BACKGROUND OF THE INVENTION

1. Technical Field

The present invention pertains to temperature sensing and monitoring systems. In particular, the present invention pertains to systems for measuring and displaying the temperature of intravenously delivered fluids and other medical items.

2. Discussion of Relevant Art

Intravenously delivered fluids and other medical items are generally required to have temperatures within specific temperature ranges in order to avoid serious injury to a patient. Although there exist warming systems to heat items to their corresponding temperature ranges, medical personnel generally do not have a manner in which to ascertain temperature of the items once the items have been removed from those systems. In addition, medical personnel generally do not have a manner in which to ascertain fluid temperature during infusion into a patient. The relevant art has attempted to overcome these problems by providing a manner in which to measure and indicate temperature of fluids prior to delivery to a patient. For example, U.S. Pat. No. 522,866 (Weinhagen et al), U.S. Pat. No. 803,352 (Meyer) and U.S. Pat. No. 2,204,764 (Mayo) disclose containers having thermometers attached thereto for indicating the temperature of fluid residing in the containers. The containers are constructed to enable the thermometer bulb to access the fluid for temperature measurement.

U.S. Pat. No. 3,864,976 (Parker) discloses a laminated digital thermometer secured to a container, such as a wine bottle or a baby bottle, for determining the temperature of a fluid contained therein. The thermometer is in the form of a digital thermometer strip providing a specific digital temperature indication of fluid within the container.

U.S. Pat. No. 4,859,360 (Suzuki et al) discloses a blood bag having a temperature-monitoring device in the form of a tag or label adhered to the bag outer surface. The temperature-monitoring device includes plural reversible temperature indicators each associated with a specific temperature range to indicate a current temperature of the blood, and an irreversible temperature indicator to indicate that the blood has currently or previously reached a predetermined temperature. The reversible indicators individually provide visual indications in response to the current blood temperature being within a corresponding range, while the irreversible indicator maintains a visual indication once the predetermined temperature has been reached.

With respect to ascertaining fluid temperature during infusion, U.S. Pat. No. 3,651,695 (Brown) discloses a temperature indicator for fluid conduits that changes color in response to temperature. A color reference chart is provided adjacent the indicator to indicate the temperatures corresponding to the color variations.

U.S. Pat. No. 5,806,528 (Magliochetti) discloses an irrigation fluid delivery system including a fluid delivery tube having a temperature sensing device for measuring and providing a visual indication of the fluid temperature prior to delivery to a patient. The temperature sensing device is disposed in the tube in stripe form and typically exhibits at least one color change in response to a change in temperature to indicate fluid temperature.

The relevant art suffers from several disadvantages. In particular, the Weinhagen et al, Meyer and Mayo devices require special attachment mechanisms to affix thermometers to containers, while the containers are configured to provide the thermometers with access to the fluid, thereby increasing complexity and cost of these systems. Further, in the case of medical or sterile fluids, these systems enhance the possibility of fluid contamination, thereby risking injury to a patient. Moreover, since the thermometers tend to be rigid and fragile, the thermometers may be easily damaged during transport and/or storage of the containers. In addition, thermometer temperature indications tend to be difficult to read, thereby requiring additional time and complicating ascertainment of the fluid temperature.

Although the Parker and Suzuki et al temperature devices are less intrusive and display a specific digital temperature indication of a fluid, these devices operate within a narrow temperature range. Thus, the Parker and Suzuki et al temperature devices are limited in application to fluids having acceptable temperatures within a specific and narrow temperature range. If a fluid temperature extends beyond that narrow range, these devices do not provide a manner in which to indicate that temperature.

The Brown and Magliochetti systems do not provide a specific temperature indication. Rather, these systems employ color indications requiring users to reference or recollect the temperature color scheme, thereby requiring additional time and complicating ascertainment of fluid temperature.

OBJECTS AND SUMMARY OF THE INVENTION

Accordingly, it is an object of the present invention to measure and numerically indicate a temperature of intravenously delivered fluids via a temperature sensing strip prior to delivery to a patient.

It is another object of the present invention to measure and numerically indicate a temperature of intravenously delivered fluids residing within containers (e.g., bags, bottles, etc.) via a temperature sensing strip attached to and in thermal relation with the container.

Yet another object of the present invention is to measure and numerically indicate a temperature of intravenous fluids during infusion to a patient via a temperature sensing strip attached to and in thermal relation with a fluid delivery tube.

Still another object of the present invention is to measure and visually indicate temperature of medical containers via a stand, plate, receptacle or other structure employing a temperature sensing strip.

A further object of the present invention is to measure and visually indicate temperature of medial items within a thermal treatment system via temperature sensitive strips residing within thermal treatment system compartments.

The aforesaid objects are achieved individually and/or in combination, and it is not intended that the present invention be construed as requiring two or more of the objects to be combined unless expressly required by the claims attached hereto.

According to the present invention, an intravenous solution bag includes a temperature sensing device in the form of a temperature sensing strip. The strip includes a temperature scale and corresponding temperature sensitive substances that change color or illuminate the scale indicators to visually indicate solution temperature. The strip may be formed integral with the bag, may be attached to the bag exterior surface, may be laminated to the bag exterior surface or may be encased with the bag within a solution bag liner. Further, the temperature sensing strip may be affixed to bottles containing intravenous or other solutions, where the strip is attached to the bottle exterior surface or to a label affixed to the bottle to measure and indicate temperature of fluid contained therein as described above. Moreover, the temperature sensing strip may be employed by an infusion apparatus to measure and indicate solution temperature prior to or during infusion. In this case, the strip may be affixed to a receptacle suspending a solution bag, or to a fluid delivery tube to measure and indicate temperature as described above. In addition, the temperature sensing strip may be disposed within thermal treatment system compartments to measure and provide a visual indication of temperatures of medical items residing within the compartments.

Alternatively, the strip may be employed by a stand, plate, receptacle or other structure receiving a medical item or container. The item is placed in the structure in thermal relation with the strip to facilitate a temperature measurement and indication as described above. The structure may be a stand-alone unit or may be attached to a thermal treatment or other system to facilitate temperature measurement.

The above and still further objects, features and advantages of the present invention will become apparent upon consideration of the following detailed description of specific embodiments thereof, particularly when taken in conjunction with the accompanying drawings wherein like reference numerals in the various figures are utilized to designate like components.

BRIEF DESCRIPTION OF THE DRAWINGS

FIG. 6 is a view in perspective of a pressurized infusion system suspended from an intravenous pole, whereby a solution bag receptacle and/or an intravenous tube may include a temperature sensing device for measuring and displaying the temperature of solution contained within the bag or traversing the tube according to the present invention.

FIG. 7 is a side view in perspective of the pressurized infusion system of FIG. 6.

FIG. 9 is an exploded view in perspective of a temperature stand employing a temperature sensing device to measure and display the temperature of a medical item according to the present invention.

FIG. 10 is a perspective view of a medical item disposed within the stand of FIG. 9.

FIG. 11A is a perspective view of a temperature plate employing a temperature sensing device to measure and display temperature of fluid within a solution bag according to the present invention.

FIG. 11B is a bottom view in partial section of the temperature plate of FIG. 11A.

DETAILED DESCRIPTION OF THE PREFERRED EMBODIMENTS

Figure 1:
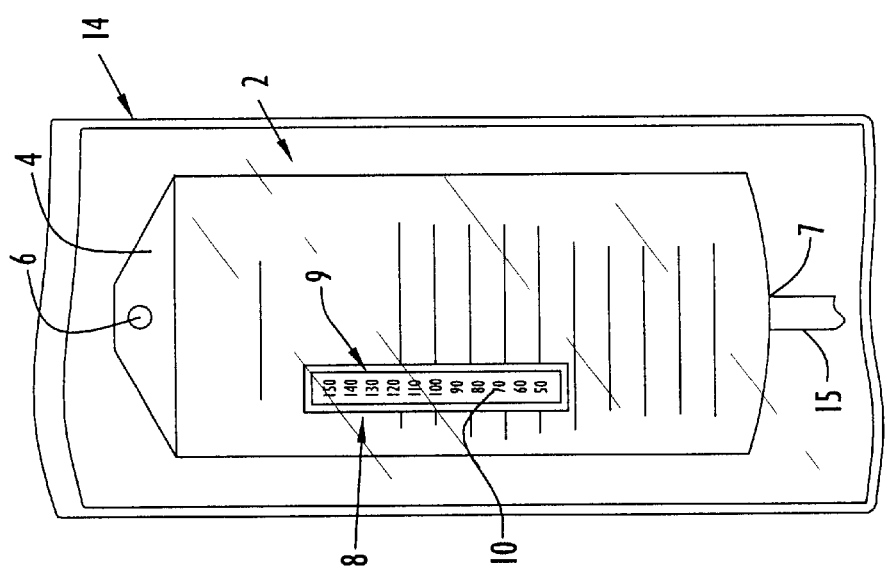
FIG. 1 is a view in elevation of an intravenous solution bag having a temperature sensing device disposed on the bag exterior surface for measuring and displaying the temperature of solution contained within the bag according to the present invention.

An intravenous solution bag having a temperature sensing device disposed on an intravenous solution bag exterior surface in accordance with the present invention is illustrated in FIG. 1. Specifically, intravenous solution bag 2 is preferably implemented by a conventional intravenous solution bag and constructed of plastic or other materials commonly utilized for forming those types of bags. The solution bag may contain various types of solutions, such as saline solution, blood, antibiotic or other drugs, or any other intravenously administered solution. Intravenous solution bag 2 further includes a generally triangular projection 4 attached to and extending from the bag upper portion. Projection 4 preferably includes a truncated upper portion having an opening or hole 6 defined therein for interfacing an intravenous pole or other support structure (not shown). The bag lower portion includes an outlet 7 and associated fluid conduits 15 to interface an intravenous tube (not shown) and enable the solution to flow through the tube from the outlet to a patient.

Generally, intravenous solutions are required to be within a specific temperature range during infusion to avoid injury to a patient. For example, fluids intravenously administered to a patient are typically required to have a temperature near the patient body temperature approximately in the range of 86° F.–104° F. In order to monitor the temperature of the intravenous solution, intravenous solution bag 2 further includes a temperature sensing device, preferably in the form of a temperature sensing strip 8. Temperature sensing strip 8 is substantially rectangular and includes a temperature scale 9 arranged in a vertical fashion to measure and display a solution temperature in the approximate range of 50° F.–150° F. The temperature scale typically includes numerical indicators 10 arranged in sequential order, whereby each indicator represents a ten degree temperature interval (e.g. 50° F., 60°, 70° F., 80° F., 90° F., 100° F., 110° F., 120° F., 130° F., 140° F. and 150° F.).

The temperature sensing strip preferably includes a series of temperature sensitive substances that provides visual color changes to or illuminates the temperature scale indicators to display a solution temperature. In particular, each temperature scale indicator 10 is typically associated with a temperature sensitive substance having a particular temperature threshold range corresponding to that indicator. When the solution temperature is within the threshold temperature range of a substance, that substance changes color or illuminates the associated temperature scale indicator to display the solution temperature. For example, if the solution has a temperature of 90° F., then only the temperature scale indicator representing a ninety degree temperature changes color or becomes illuminated to visually display the solution temperature. The temperature thresholds may be adjusted in any manner to enable a single or a plurality of temperature scale indicators to be illuminated in response to a solution temperature residing between successive temperature scale indicators. Further, the temperature thresholds may be set to illuminate a successive indicator (e.g., a 60° F. indicator may be set to illuminate at any temperature between 50° F.–60° F.).

The temperature sensing strip is preferably implemented by a conventional temperature strip having common temperature sensitive substances (e.g., a liquid crystal composition), such as the types of substances disclosed in U.S. Pat. No. 3,651,695 (Brown), U.S. Pat. No. 3,861,213 (Parker), U.S. Pat. No. 3,864,976 (Parker), U.S. Pat. No. 4,859,360 (Suzuki et al) and U.S. Pat. No. 5,806,528 (Magliochetti). The disclosures of the foregoing patents are incorporated herein by reference in their entireties. The temperature sensing strip may be formed integral with the solution bag, or be attached to the solution bag exterior surface at any suitable location via any conventional or other fastening techniques (e.g., adhesives, pressure heating, lamination, etc.). In addition, the temperature sensing strip may be of any size or shape, may sense any desired temperatures, and may include a temperature scale arranged in any fashion and having any type of indicators (e.g., alphanumeric or other characters) representing any temperature intervals or other information for any desired temperature range. Alternatively, the temperature sensing strip may be configured with or without a temperature scale and may change to various colors, such as red, green and blue, based on the solution temperature to indicate that the solution temperature is above, within or below the specified range, respectively.

In operation, the temperature sensing strip is disposed on a solution-filled bag to measure and display solution temperature. The bag is typically thermally treated to attain the desired temperature for administration to a patient, whereby temperature sensing strip 8 measures and displays the solution temperature during thermal treatment as described above. Once the solution reaches the desired temperature, the intravenous solution bag may be suspended from an intravenous pole or other structure and connected to an intravenous tube to facilitate infusion of the solution from the bag to a patient. Alternatively, the bag may be heated to the desired temperature while being suspended from the intravenous pole as described below. During infusion, temperature sensing strip 8 measures the solution temperature and displays it to medical personnel to ensure that the infused solution is within the appropriate temperature range.

Figure 2:
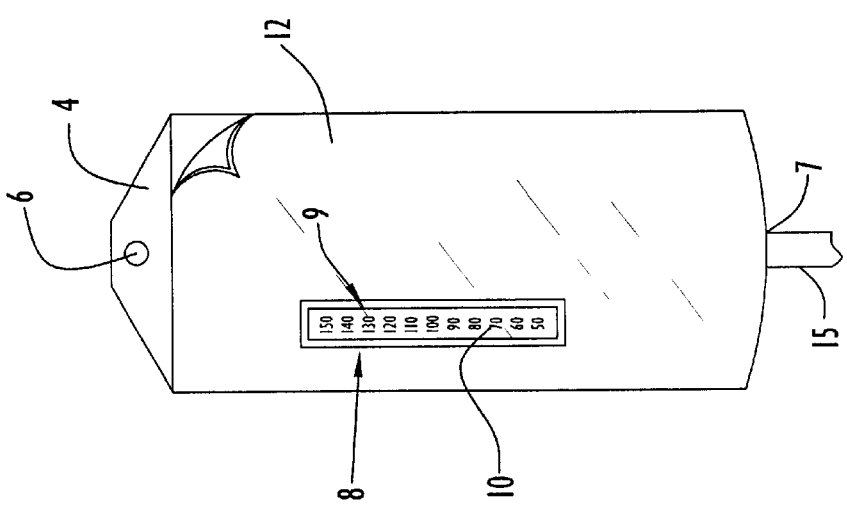
FIG. 2 is a view in elevation of an intravenous solution bag having a temperature sensing device laminated to the bag exterior surface for measuring and displaying the temperature of solution contained within the bag according to the present invention.

An intravenous solution bag having a laminated layer to attach the temperature sensing device to the bag is illustrated in FIG. 2. Intravenous solution bag 2 and temperature sensing strip 8 are substantially similar to the solution bag and temperature strip described above, except that temperature sensing strip 8 is laminated to the solution bag exterior surface. Specifically, the temperature sensing strip is disposed proximate the exterior surface of the bag at any suitable location, while an additional layer of material 12 is placed over the strip. The material is preferably laminated or otherwise attached to the bag exterior surface such that the temperature sensing strip is attached to the bag and disposed between the bag and laminated layer. The laminated layer material may be constructed of any type of plastic or other suitable materials (e.g., material of the type utilized to form the solution bag), and may be laminated or attached to the bag via any conventional or other fastening techniques (e.g., pressurized heating techniques, etc.). Further, the laminated layer material may be of any shape or size sufficient to attach the temperature sensing strip to the bag, while being sufficiently transparent to enable viewing of the displayed temperature on the temperature sensing strip. The temperature sensing strip measures and displays the temperature of the solution contained within the bag as described above.

Figure 3:
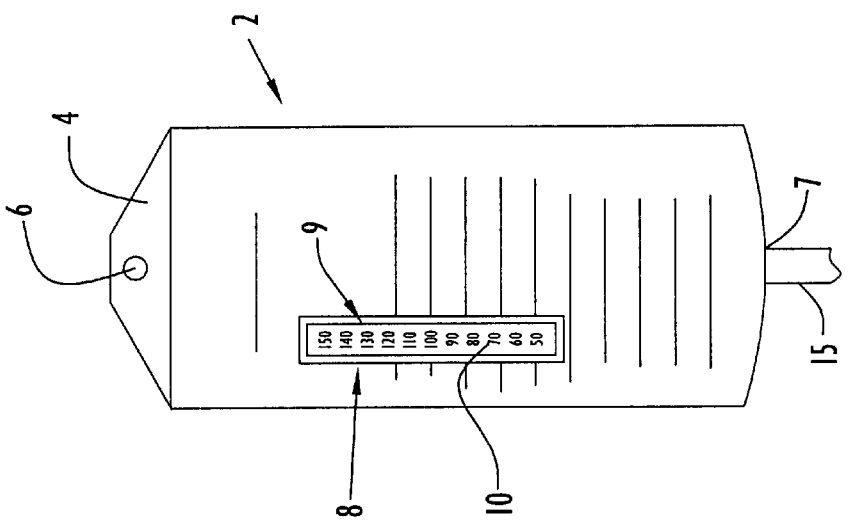
FIG. 3 is a view in elevation of an intravenous solution bag disposed within a liner, whereby a temperature sensing device is attached to the bag or liner, or disposed between the bag and liner, for measuring and displaying the temperature of solution contained within the bag according to the present invention.

Alternatively, intravenous solution bag 2 may be encased in a liner or receptacle, while the temperature sensing device may be attached either to the bag or liner or disposed between the bag and liner as illustrated in FIG. 3. Specifically, intravenous solution bag 2 and temperature sensing strip 8 are substantially similar to the solution bag and temperature strip described above, except that the solution bag is disposed within a liner or receptacle 14. Liner 14 may be constructed of any type of plastic or other suitable materials (e.g., materials of the type utilized to form the solution bag), and preferably has dimensions slightly greater than the dimensions of solution bag 2 to receive and house the solution bag.

Liner 14 is preferably sealed along its edges via any conventional or other fastening techniques, whereby the sealed liner insulates the solution bag from ambient air temperature, thereby facilitating a temperature measurement with enhanced accuracy. The temperature sensing strip may be disposed in various fashions internal or external of the liner to provide a temperature indication. For example, the temperature sensing strip may be attached to or formed integral with the intravenous solution bag as described above, whereby the solution bag and temperature sensing strip are inserted within liner 14 to facilitate measurement and display of the solution temperature. Liner 14 is sufficiently transparent to enable medical personnel to readily view the solution temperature displayed on the temperature sensing strip through the liner to ascertain the solution temperature.

Further, the temperature sensing strip may be disposed between the solution bag exterior surface and the interior surface of liner 14, whereby the strip is unattached to either the solution bag or liner. Basically, the expansion of the solution bag within the liner enables the liner to press the temperature sensing strip against the solution bag to measure and display the solution temperature. Moreover, the temperature sensing strip may be attached to or formed integral with the interior or exterior surface of the liner via any conventional or other fastening techniques to measure and display the solution temperature as described above. In addition, the temperature sensing strip may be disposed at any location on or between the solution bag and liner capable of enabling the temperature sensing strip to provide the solution temperature.

In operation, the intravenous solution bag and temperature sensing strip function in substantially the same manner described above, except that liner 14 is opened in order to connect the intravenous solution bag to an intravenous tube and facilitate infusion of the solution from the bag to a patient.

Intravenous or other solutions may further be contained within bottles, whereby the bottles may be utilized for storing and administering intravenous solutions (e.g., saline solution, blood, antibiotics or other drugs, etc.) or other medical items (e.g., drugs administered via a syringe or other technique, etc.). The bottles may be thermally treated to maintain the contained items within their corresponding temperature ranges (e.g., intravenous solutions are typically required to be administered near body temperature approximately in the range of 86° F.–104° F., while certain drugs are typically required to be stored and administered near room temperature in the approximate range of 70° F.–79° F.). Since administration of solutions or other medical items outside their temperature range may cause injury to a patient, it is important that the item temperatures be known prior to or during use.

Figure 4:
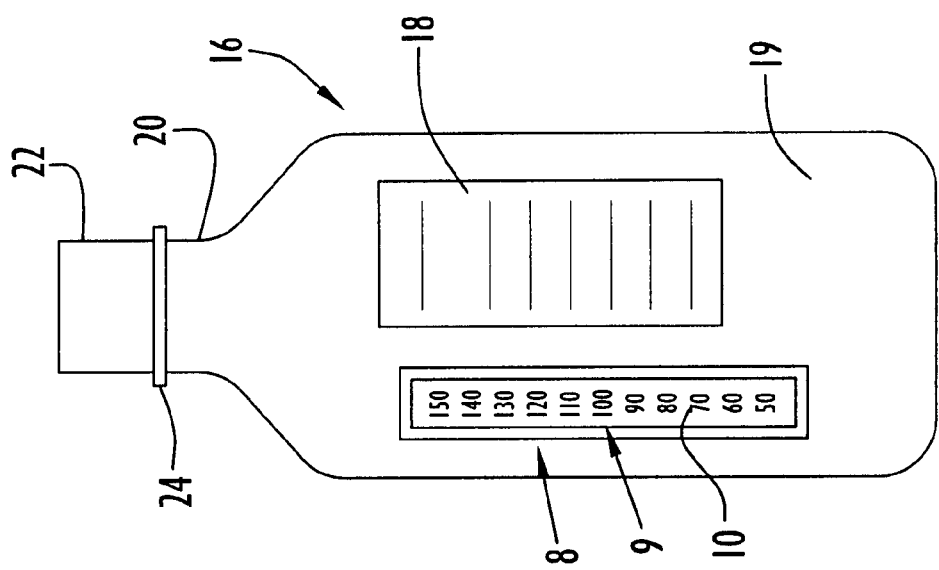
FIG. 4 is a view in elevation of a medical bottle having a temperature sensing device disposed on the bottle exterior surface for measuring and displaying the temperature of the bottle contents according to the present invention.

Accordingly, a medical bottle having a temperature sensing device to measure and display the temperature of solution or other medical items contained within the bottle is illustrated in FIG. 4. Specifically, a bottle 16 for containing a solution or other medical items includes a container portion 19, a removable cap 22, a temperature sensing device in the form of a temperature sensing strip 8 and a label 18. Container portion 19 is generally cylindrical and includes a tapered upper portion forming a generally cylindrical neck 20. The neck preferably has dimensions substantially less than the dimensions of the container portion, and includes a collar 24 and a threaded spout (not shown). The spout is disposed at the neck distal end and includes a series of threads (not shown) to engage cap 22. Collar 24 is attached to and about the neck proximally of the spout and extends outward from the neck exterior surface to serve as a gripping portion and stop for grasping the bottle and guiding placement of cap 22 onto the bottle, respectively. Cap 22 is generally cylindrical and includes threads formed in the cap interior surface that engage the spout threads to removably attach the cap to the bottle.

Label 18 is typically attached to the container portion exterior surface and includes information pertaining to the contents of the bottle. Temperature sensing strip 8 is substantially similar to the temperature strip described above and is attached to the container portion exterior surface adjacent label 18. However, the label and temperature sensing strip may be disposed on or formed integral with the bottle at any suitable location via any conventional or other fastening techniques. In operation, the bottle may be thermally treated and utilized for intravenous infusion, storage and/or administration of drugs or supplying items for various medical procedures, while the temperature sensing strip measures and displays the solution or other medical item temperature in substantially the same manner described above.

Figure 5:
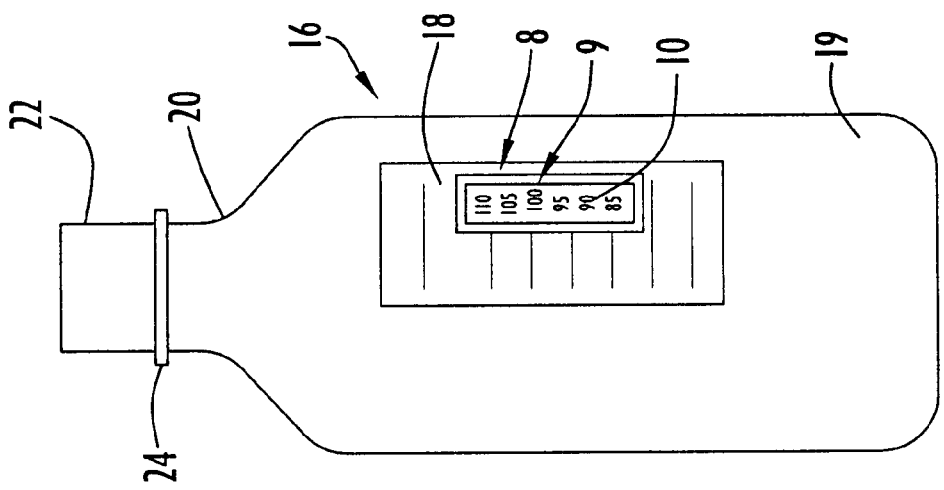
FIG. 5 is a view in elevation of a medical bottle having a temperature sensing device disposed on the bottle label for measuring and displaying the temperature of the bottle contents according to the present invention.

The temperature sensing device may alternatively be disposed on or formed integral with a bottle label as illustrated in FIG. 5. Specifically, bottle 16 and temperature sensing strip 8 are substantially similar to the bottle and temperature strip described above, except that the temperature sensing strip includes a narrower and more precise temperature scale and is disposed on the label. The temperature sensing strip may be attached to or formed integral with the label via any conventional or other fastening techniques. The dimensions of the temperature sensing strip are preferably less than the label dimensions in order to enable the temperature sensing strip to fit within the label confines. Further, the temperature scale range indicated on the temperature sensing strip may be reduced to accommodate the reduced size of the strip.

The temperature sensing strip, by way of example only, displays temperatures in the approximate range of 85° F.–110° F., whereby each temperature scale indicator represents a successive five degree temperature interval (e.g., 85° F., 90° F., 95° F., 100° F., 105° F. and 110° F.). However, the label and temperature sensing strip may be of any size or shape, while the temperature scale may include any indicators for representing any sized intervals in any desired temperature range. The temperature sensing strip measures and displays the solution or medical item temperature in substantially the same manner described above. Alternatively, the label may be constructed of temperature strip material such that the label may change to various colors, such as red, green and blue, based on the solution or medical item temperature to respectively indicate that the solution or medical item temperature is above, within or below the desired temperature range as described above.

The temperature sensing strip may be further utilized during infusion of intravenous solution to a patient as illustrated in FIGS. 6–7. Specifically, a pressurized infusion system 30 is typically mounted on a conventional intravenous (IV) pole 32 and includes a receptacle 34 for containing intravenous solution or other liquid and engaging pole 32, a pressure gauge 36, an inflatable pressure device or bellows 38, a bulb 40 for regulating fluid pressure within the bellows via a hose 21, and an intravenous or other tube 42 for directing liquid from the receptacle to a patient. The pressurized infusion system may be of the types disclosed in U.S. patent application Ser. No. 09/380,507, entitled "Method and Apparatus for Pressure Infusion and Temperature Control of Infused Liquids" and filed Sep. 3, 1999, the disclosure of which is incorporated herein by reference in its entirety. Receptacle 34 typically receives an intravenous solution bag 3 (e.g., a bag containing intravenous solution or other liquid, however, a solution bottle may similarly be employed) and bellows 38, whereby the bellows is disposed within a bellows bag 44 and positioned adjacent the intravenous solution bag. Hose 21 extends between bellows 38 and bulb 40, whereby manipulation of the bulb drives fluid into or from the bellows through hose 21. Inflation of bellows 38 via bulb 40 enables the bellows to expand within bellows bag 44 and apply pressure to intravenous solution bag 3, thereby driving liquid from the intravenous solution bag through tube 42 to a patient. Bulb 40 includes a valve 46 to release fluid from bellows 38 such that the bulb may add or reduce pressure applied by the bellows to intravenous solution bag 3 based on pressure levels within the bellows indicated by pressure gauge 36.

Receptacle 34 is constructed of a substantially transparent material and includes a compartment or storage area 23 and a generally triangular projection 48 extending from the upper portion of the compartment to engage pole 32. The compartment is in the form of a substantially rectangular bag having an open top potion and includes dimensions greater than the combined dimensions of intravenous solution bag 3 and bellows bag 44 (i.e., containing bellows 38) in order to receive these items. The front portion of compartment 23 includes flaps 50, 52 that are fastened together via a zipper 33 or any other fastening device. Generally triangular projection 48 extends from the upper back portion of compartment 23 and includes a loop 56 disposed toward the upper portion of a rear exterior surface of the projection. Loop 56 engages pole 32 to enable receptacle 34 to be attached to the pole.

System 30 may further include a heater or heating element to heat intravenous solution bag 3 for pressurized infusion of heated liquid into a patient. Specifically, a heater or heating element 62 and conductive plate 64 may be disposed within a pocket of bellows bag 44 such that the heating element and conductive plate are located adjacent intravenous solution bag 3. The conductive plate is disposed between the heating element and intravenous solution bag, whereby inflation of bellows 38 presses the conductive plate against the intravenous solution bag to apply heat from the heating element to the liquid contained within that bag. A substantially rectangular control box 58 is mounted on pole 32 and includes circuitry to control power supplied to the heating element. Control box 58 receives power from a common wall outlet jack via a power cord 60.

Temperature sensing device 8 is disposed on system 30 and is substantially similar to the temperature strips described above, except that the temperature sensing device includes a configuration where temperature scale 9 has duplicate temperature scale indicators 10 for each temperature level with corresponding temperature sensitive substances disposed between the duplicate scale indicators. The temperature sensitive substances illuminate or change color as described above to enable the corresponding scale indicators to indicate a solution temperature. By way of example only, temperature sensing device 8 displays temperatures in the range of 70° F.–110° F., whereby the duplicate temperature scale indicators 10 for each level represent a successive ten degree temperature interval (e.g., 70° F., 80° F., 90° F., 100° F. and 110° F.). However, the temperature sensing device may be of any size or shape, while the temperature scale may include any quantity or types of indicators for representing any sized intervals in any desired temperature range.

The temperature sensing device may be disposed in various fashions to measure and display the solution temperature during heating and/or pressurized infusion. For example, the temperature sensing strip may be attached to or formed integral with intravenous solution bag 3 as described above, whereby the solution bag and temperature sensing strip are disposed within receptacle 34 to facilitate pressurized infusion to a patient, while displaying the solution temperature to medical personnel (e.g., viewable through the receptacle). Further, the temperature sensing strip may be disposed at any location between the solution bag exterior surface and the receptacle interior surface, whereby the temperature sensing strip is unattached to the solution bag or receptacle. Basically, the expansion of the solution bag enables the receptacle to press the temperature sensing strip against the solution bag to measure and display the solution temperature (e.g., viewable through the receptacle). Moreover, the temperature sensing strip may be attached to or formed integral with the interior (e.g., viewable through the receptacle) or exterior surfaces of receptacle flaps 50, 52 (e.g., as shown in FIG. 6) at any location via any conventional or other fastening techniques. In addition, the temperature sensing strip may be attached to an infusion cuff, or may be disposed about, attached to or formed integral with tube 42 at any location, via any conventional or other fastening techniques to measure and display the solution temperature near the entry site or within the tube, respectively.

Figure 8:
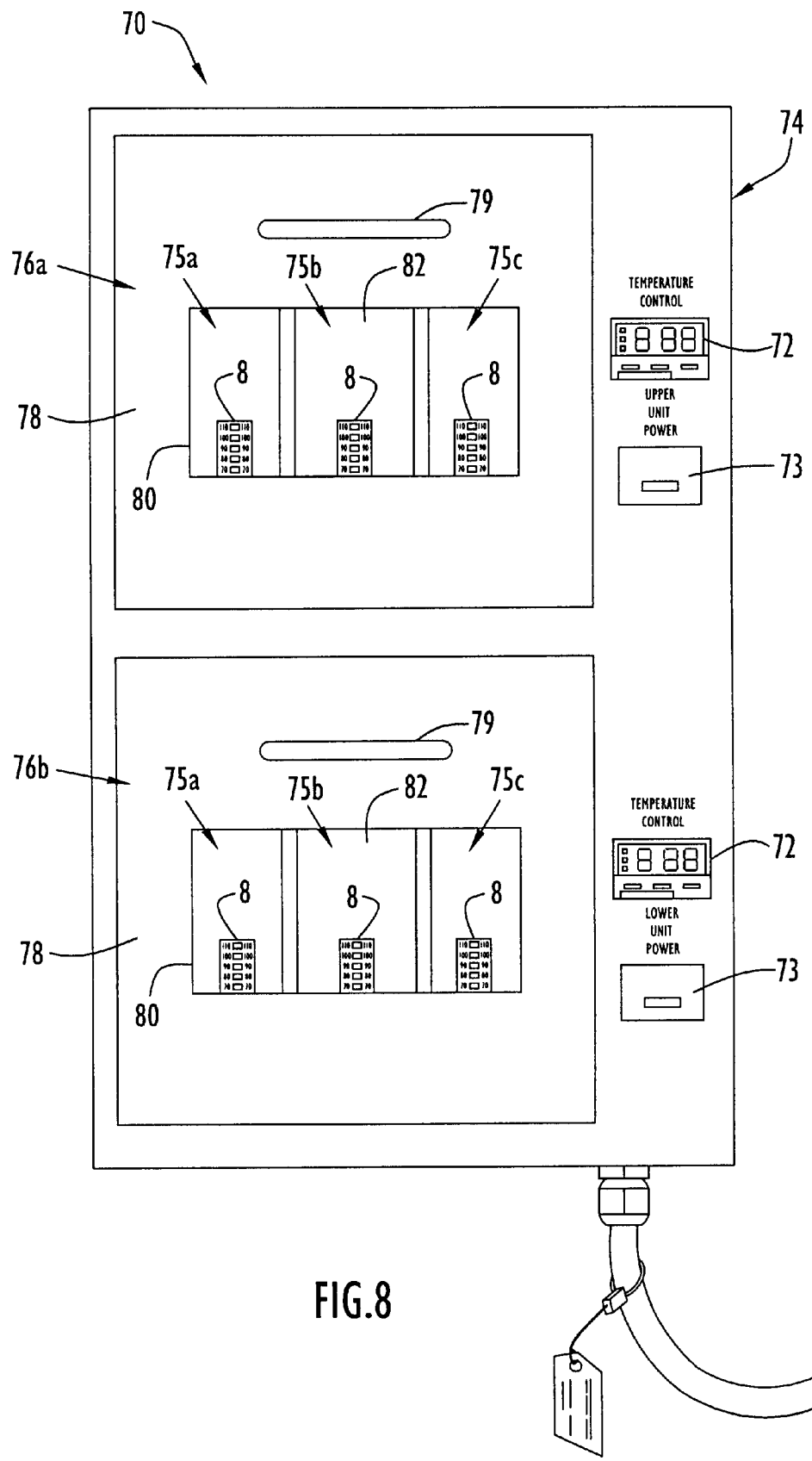
FIG. 8 is a front view in elevation of a warming system employing temperature sensing devices to measure and display the temperature of medical items contained within system compartments according to the present invention.

Additionally, the temperature sensing strip may be utilized with systems that thermally treat a solution or other medical items (e.g., instruments, blankets, bottles, drugs/antibiotics, etc.) to measure and provide a temperature indication for the items as illustrated, by way of example only, in FIG. 8. Specifically, intravenous solution bags or other medical items are typically heated to the temperature ranges appropriate for their contents (e.g., solutions, drugs, etc.) by a warmer system 70. The warmer system may be of the types disclosed in U.S. patent application Ser. No. 09/419,664, entitled "Temperature Control System and Method for Heating and Maintaining Medical Items at Desired Temperatures" and filed Oct. 15, 1999, the disclosure of which is incorporated herein by reference in its entirety. System 70 includes a cabinet or system housing 74 having substantially similar drawers 76a, 76b for enabling placement and removal of medical items, such as intravenous solution bags, within the system and corresponding controllers 72 for individually controlling heating of the drawers to maintain the bags at the same or different desired temperatures.

Drawers 76a, 76b are generally disposed in vertical alignment in a cabinet front wall, while controllers 72 are each disposed in the cabinet front wall adjacent a corresponding drawer 76a, 76b and power switch 73. Each controller 72 enables entry of a desired or set point temperature associated with a corresponding drawer and controls heating of intravenous solution bags residing within the corresponding drawer based on the associated desired temperature. Each power switch 73 is generally disposed below a corresponding controller 72 and enables power to that controller for heating intravenous solution bags disposed within the corresponding drawer.

The drawers each include a front wall or door 78, and rear, bottom and side walls (not shown). The drawer walls are each substantially rectangular and collectively define a compartment or drawer interior having an open top portion for enabling placement and removal of intravenous solution bags within the drawers. Door 78 includes a handle 79 typically disposed toward the door upper portion, whereby the handle may be implemented by any conventional or other type of handle. Door 78 generally enables a corresponding drawer to pivot into and out of the cabinet via a hinge (not shown), and further includes a substantially rectangular opening 80 covered by a substantially transparent material 82, such as glass, Plexiglas or acrylic, to serve as a window to enable viewing of the intravenous solution bags and maintain heat within the cabinet. Divider walls are disposed within each drawer interior to partition that interior into sub-compartments or bins 75a, 75b, 75c. Temperature sensing devices 8, substantially similar to the devices described above for FIG. 6, are disposed within compartments 75a, 75b, 75c of each drawer proximate material 82. The medical items within the compartments are in thermal relation with the corresponding temperature sensing devices to enable the devices to measure and display the item temperatures as described above. Material 82 is substantially transparent to enable viewing of the temperature indications through the window.

A heating element or pad (not shown) is typically disposed on the underside of each drawer bottom wall, whereby the heat applied by the heating pad is conducted by the drawer bottom, side, rear and divider walls to provide an even heat distribution to the intravenous solution bags or other medical items residing in the sub-compartments of that drawer. In other words, each individual drawer sub-compartment includes bottom, side and rear walls that conduct and directly transmit heat from the heating pad to the intravenous solution bag contained in that sub-compartment, thereby preventing other intravenous solution bags residing in the cabinet from being affected by the applied heat. A temperature sensor (not shown) is typically disposed on the underside of each drawer bottom wall generally within the confines of the corresponding heating pad (e.g., the portion of the heating pad not covering the drawer bottom wall) to measure the temperature of the bottom wall.

In operation, an operator selects intravenous solution bags (e.g., containing intravenous solution) or other medical items for heating within the cabinet and determines appropriate temperatures for the items. The operator subsequently selects a drawer 76a, 76b and enables a corresponding power switch 73, whereby the operator grasps and applies force to handle 79 of the selected drawer to pivot that drawer outward from the cabinet interior to an open position. Intravenous solution bags are disposed within any quantity (e.g., at least one) or combination of corresponding drawer sub-compartments 75a, 75b, 75c such that any one sub-compartment contains a single intravenous solution bag. The selected drawer is subsequently pivoted into the cabinet interior to a closed position. The desired temperature is entered into corresponding controller 72 via controller input devices or buttons. The controller receives signals from the corresponding temperature sensors and determines appropriate controls to enable or disable power to the associated heating pad. The heating pad applies heat to the corresponding drawer bottom wall, whereby the drawer rear, side and divider walls conduct heat from the bottom wall to evenly distribute heat to the intravenous solution bags residing within the corresponding drawer sub-compartments as described above.

Controller 72 displays the corresponding drawer bottom wall temperature measured by the temperature sensor, and may be directed to alternatively display the desired temperature based on manipulation of controller input devices. Temperature sensing devices 8 measure and display the medical item temperature during heating in substantially the same manner described above. When the intravenous solution bags have attained the desired temperature, the selected drawer is pivoted to an open position as described above, whereby the heated bags are removed from sub-compartments of the selected drawer for use, while that drawer is subsequently returned to a closed position. Further, additional intravenous solution bags may replace the removed heated bags within those sub-compartments for heating by the system. The temperature sensing strip may be disposed on or attached to a compartment window interior or exterior surface at any location, or may be disposed on or attached to any type of warmer or other thermal treatment system with or without temperature display capability at any suitable location to enable measurement and display of item temperature in substantially the same manner described above.

The temperature sensing device may further be employed by various structures to facilitate measurement and display of medical item temperature. A temperature stand for measuring and displaying temperature of medical items is illustrated in FIGS. 9–10. Specifically, a temperature stand 53 includes a base 54, a front panel 55, an item support 56 and a rear support 57. Base 54 is substantially rectangular having front panel 55 and item support 56 extending from a base top surface. The front panel is substantially rectangular having a width dimension similar to that of the base and a length dimension slightly greater than that of a medical item, such as solution bag 3. The front panel includes a tapered bottom edge and is attached to and extends upward from a base front section at an angle slightly less than ninety degrees to tilt rearward. A handle 59 is attached to an upper portion of the front panel exterior surface to enable a user to transport the stand to various locations. Item support 56 is substantially rectangular and has width and length dimensions similar to and a thickness dimension greater than the front panel. The item support includes a tapered bottom edge and is attached to and extends upward from a base intermediate section substantially in parallel with the front panel. The item support and front panel are separated by a distance to form a receiving area 51 therebetween having sufficient dimensions for receiving a medical item, such as solution bag 3.

Temperature sensing device 8, substantially similar to the device described above for FIG. 6, is disposed within a substantially central portion of front panel 55 to measure and display item temperature. The temperature sensing device is disposed on the front panel interior surface to enable an item placed in receiving area 51 to contact the device rear portion. Item support 56 and front panel 55 secure the item within the receiving area and ensure contact with temperature sensing device 8. The front panel is constructed of substantially transparent material to permit a temperature indication of the temperature sensing device to be viewed from the front of the stand. The distance between the item support and front panel may be adjusted to accommodate various medical items (e.g., blankets, instruments, antibiotics, drugs, solution bags (e.g., ½ liter, one liter, three liters, five liters, etc.), bottles (e.g., ½ liter, one liter, 1½ liters, etc.) or other items the temperature of which is desired).

Rear support 57 is substantially rectangular and has a width dimension similar to that of the base. The rear support is attached to the base rear edge and includes a ledge 49 extending transversely from a rear support bottom edge. The rear support extends upward from and substantially perpendicular to the base and is attached to the item support upper portion. The item support upper portion is truncated to facilitate attachment to the rear support. The rear support provides enhanced stability to the stand for containing medical items.

Operation of the stand is now described. Initially, an item, such as solution bag 3, may be removed from storage and/or thermally treated in a thermal treatment system. The item is subsequently disposed in receiving area 51 to ascertain its temperature. The item is forced against temperature sensing device 8 by item support 56 and front panel 55 as described above. The temperature sensing device measures and displays the item temperature as described above. When the item has an acceptable temperature, it may be removed and utilized. Otherwise, the item may be placed in the thermal treatment system until an acceptable temperature is attained.

It is to be understood that the temperature sensing device of the stand may be implemented by any of the temperature sensing strips described above or by various other mechanisms. For example, the temperature sensing device may be implemented by a temperature sensor in combination with a liquid crystal display (LCD) to measure and display item temperature. This mechanism may include a battery and operate on direct current (DC) voltage, and/or include a power cord for connection to a common wall outlet jack and utilize alternating current (AC). Further, the temperature sensing device may include a temperature sensor and a voice or speech synthesizer to indicate temperature or to specify that an item is below or exceeds a predetermined temperature. Moreover, the temperature sensing device may employ an analog or infrared temperature sensor to measure the item temperature and convey that temperature in any of the manners described above. In addition, the temperature sensing device may employ any of the above temperature sensing strips and/or mechanisms individually or in any combination to measure and display item temperatures.

A temperature plate for measuring and displaying item temperature is illustrated in FIGS. 11A–11B. Specifically, a temperature plate 63 includes a base 65 and a resilient securing member 66. Base 65 is substantially rectangular and has securing member 66 attached thereto via fasteners, such as bolts 67. The securing member may be constructed of any suitable materials, and is substantially resilient to secure a medical item, such as solution bag 3, within a receiving area 71 defined between that member and the base. The securing member has longitudinal dimensions slightly less than those of the base and includes a mounting portion 68, an arcuate intermediate section 69, and a ledge 61. The dimensions of the securing member enable heat to be retained within receiving area 71, thereby reducing heat loss by the item. Mounting portion 68 is disposed on the base top surface toward a base side edge and is attached to the base via bolts 67. Arcuate section 69 is attached to and extends from mounting portion 68 and is configured to contour the shape of the bag. Ledge 61 is attached to and transversely extends from the arcuate section distal end and serves as a gripping portion to manipulate the securing member for access to the receiving area.

Temperature sensing device 8, substantially similar to the device described above for FIG. 6, is disposed toward a substantially central portion of the securing member interior surface for contact with the medical item. Securing member 66 is substantially transparent to enable the temperature indication of the temperature sensing device to be viewed through that member. The securing member presses the item against base 65, while forcing the temperature sensing device against the item to facilitate a temperature measurement.

In operation, a medical item, such as solution bag 3, is removed from storage and/or thermally treated in a thermal treatment system. The item is subsequently placed within receiving area 71 by manipulating securing member 66 via ledge 61. The securing member forces temperature device 8 against the item, while pressing the item against the base. The temperature device measures the item temperature and displays it for viewing through the securing member. When the item has reached an acceptable temperature, the item may be removed from the plate for use. Otherwise, the item may be placed in the thermal treatment system until the item has attained an acceptable temperature. It is to be understood that the plate may utilize any of the temperature sensing strips or mechanisms described above to measure and display the item temperature.

Figure 12A:
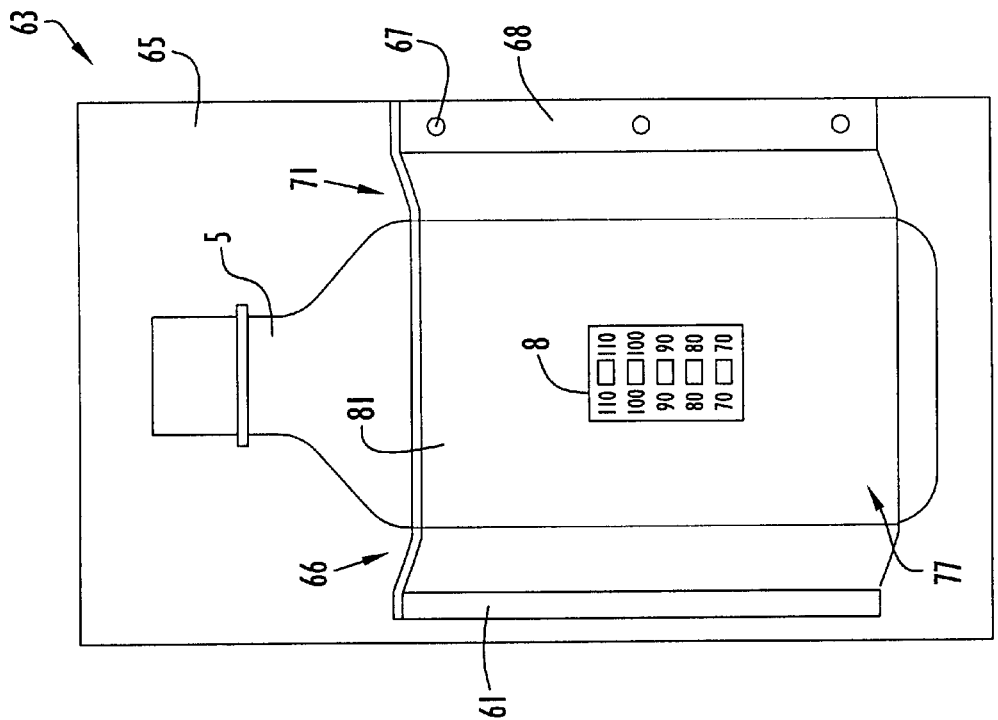
FIG. 12A is a perspective view of an alternative embodiment of the temperature plate of FIG. 11A to measure and display temperature of fluid within a solution bottle.
Figure 12B:
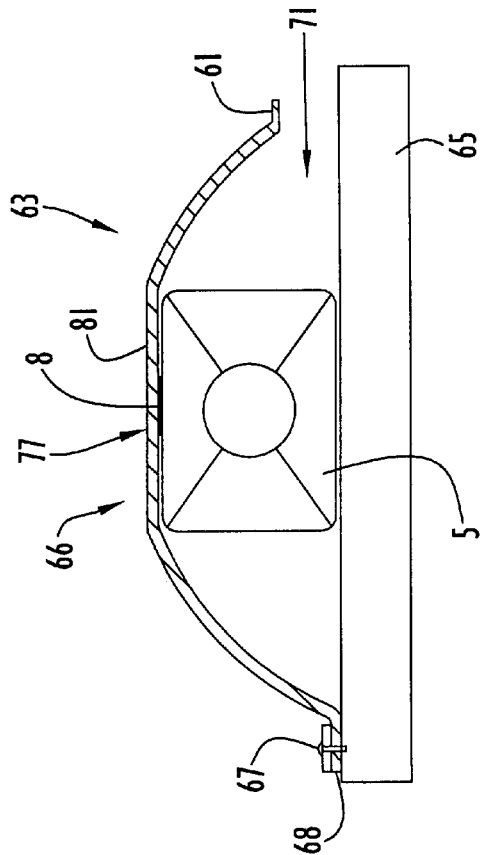
FIG. 12B is a top view in partial section of the temperature plate of FIG. 12A.

The securing member may be adjusted or configured in various fashions to accommodate items of various shapes and dimensions. For example, a temperature plate configured for bottles is illustrated in FIGS. 12A–12B. Specifically, plate 63 is substantially similar to the plate described above, except that securing member 66 is configured to substantially contour the shape of a bottle 5. Plate 63 includes base 65 and securing member 66 attached to the base via bolts 67 as described above. Securing member 66 includes mounting portion 68 and ledge 61 as described above, and a contour section 77 disposed between the mounting portion and ledge for contacting bottle 5. Contour section 77 is similar to arcuate section 69 described above, except that the contour portion includes a truncated apex forming a plateau 81 to accommodate the shape of the bottle. Temperature sensing device 8 is substantially centrally disposed on the plateau interior surface to measure and display the item temperature. The temperature plate operates in substantially the same manner described above for FIGS. 11A–11B to measure and display the temperature of the bottle contents. It is to be understood that the temperature plate may utilize any of the devices or mechanisms described above to measure and indicate an item temperature.

Figure 13:
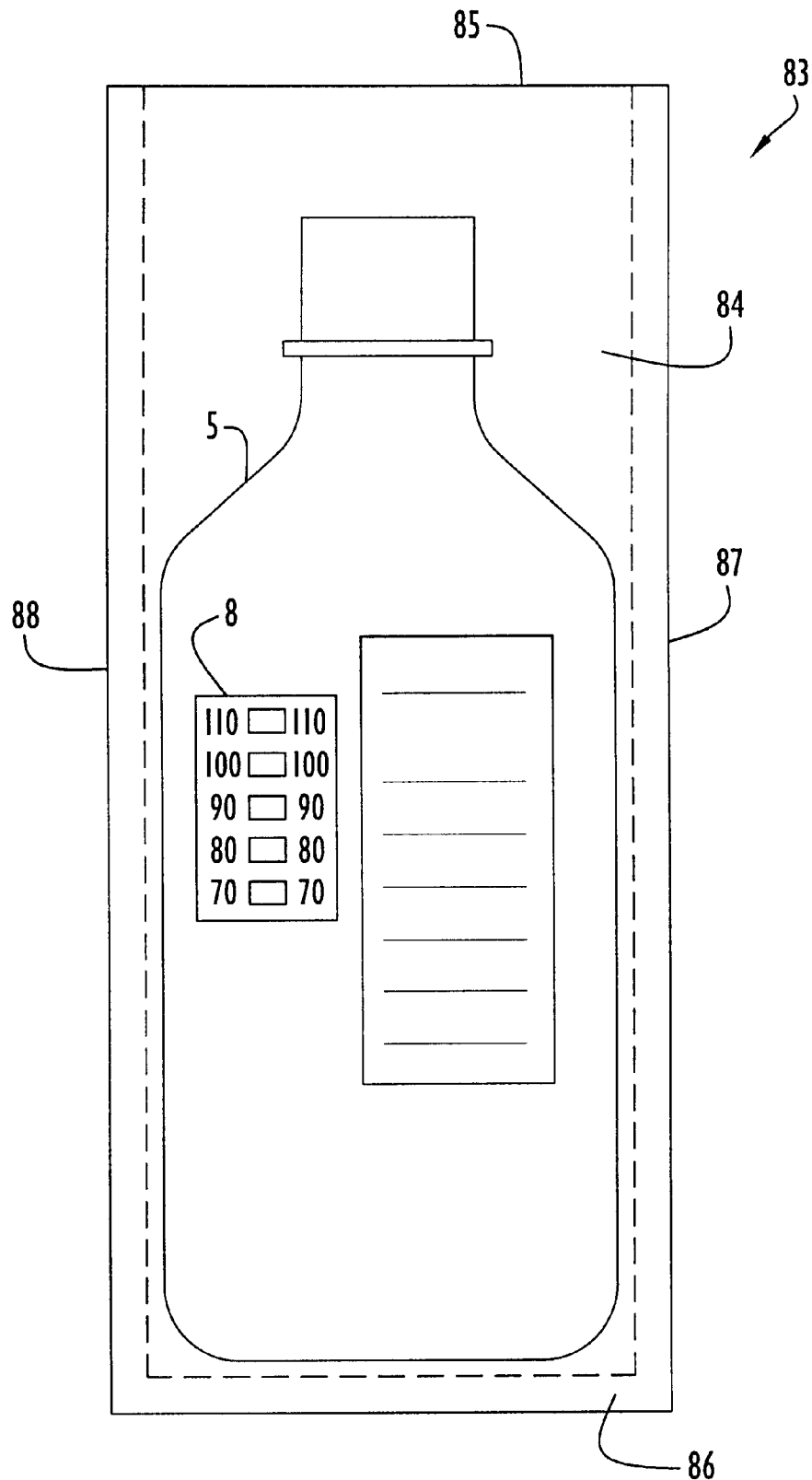
FIG. 13 is a front view in elevation of a temperature receptacle employing a temperature sensing device to measure and display temperature of fluid within a container according to the present invention.

A temperature receptacle for measuring and displaying item temperature is illustrated in FIG. 13. Specifically, a temperature receptacle 83 includes front and rear walls 84, 85, bottom wall 86 and side walls 87, 88 that collectively define the receptacle interior. The walls are each substantially rectangular and have a height dimension slightly greater than that of the item, such as bottle 5, being received in order to retain heat within the receptacle. Front wall 84 is substantially transparent and includes temperature sensing device 8 disposed on the front wall interior surface. The temperature sensing device is substantially similar to the device described above for FIG. 6, and contacts a medical item within the receptacle interior to display a measured temperature that may be viewed through front wall 84. The receptacle interior is configured to have dimensions sufficient to press the item against the temperature sensing device.

In operation, a medical item, such as bottle 5, is removed from storage and/or thermally treated within a thermal treatment system. The item is subsequently disposed within receptacle 83 and contacts temperature sensing device 8. The temperature sensing device measures and displays an item temperature that is viewable through front wall 84. When the item reaches a desired temperature, it may be removed for use. Otherwise, the item may be placed in the thermal treatment system until an acceptable temperature has been attained. It is to be understood that the receptacle may utilize any of the devices or mechanisms described above to measure and indicate an item temperature, and may be of any shape or size to accommodate any medical items.

Figure 14:
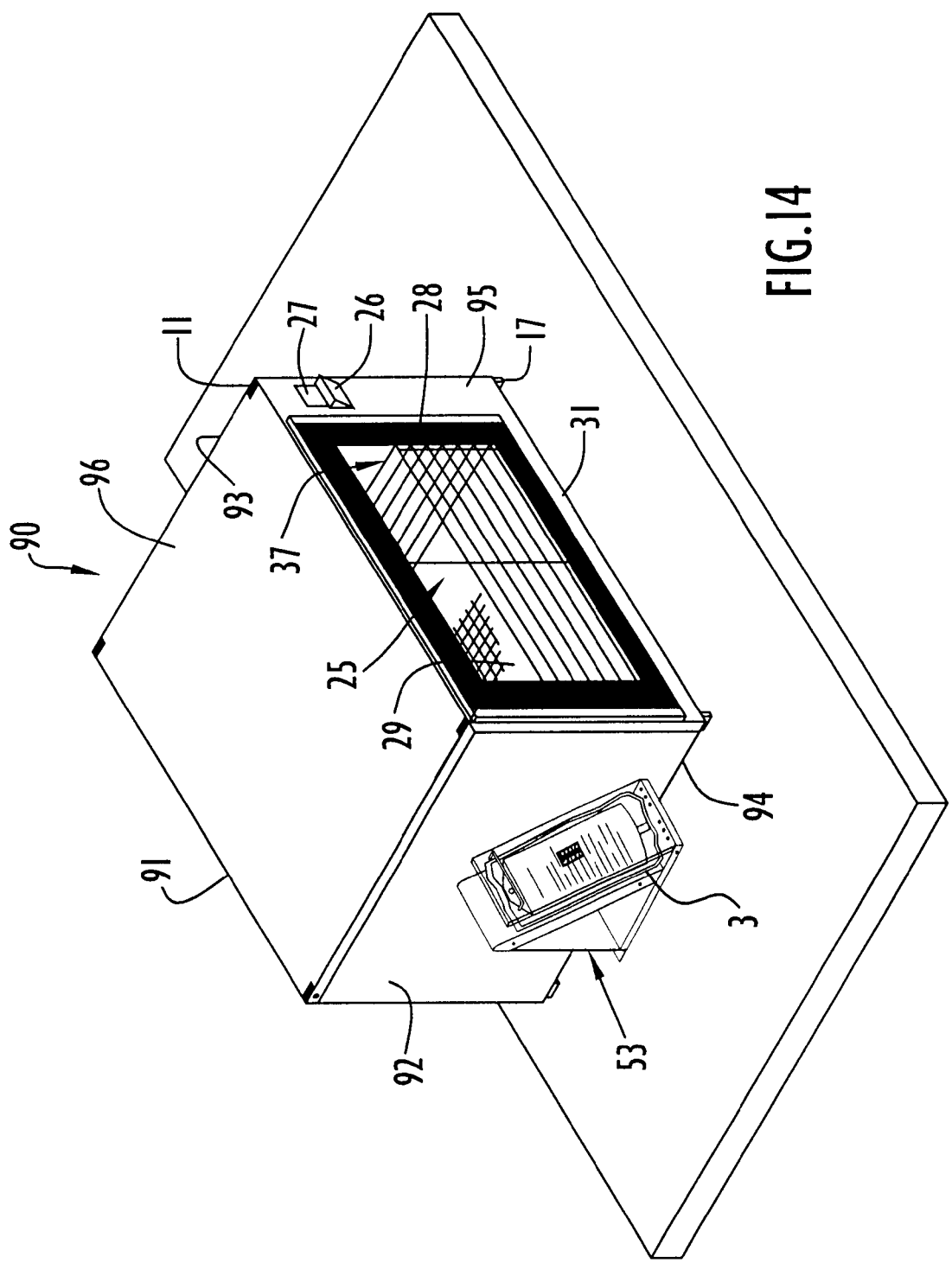
FIG. 14 is a view in perspective of the temperature stand of FIG. 9 coupled to a warming system side wall according to the present invention.

The temperature stand, plate and receptacle described above are typically portable stand-alone units that may be placed on any suitable surfaces (e.g., counters, tables, stands, etc.) and/or proximate various thermal treatment systems. Alternatively, these structures may be mounted to walls or other support structures, or may be attached to various thermal treatment systems to provide a temperature measurement for thermally treated items. A temperature stand attached to a warming system, by way of example only, is illustrated in FIG. 14. Specifically, a warmer unit 90 includes a rear panel 91, two substantially similar side panels 92, 93, a top panel 96, a bottom panel 94 and a front panel 95. The warmer unit may be of the types disclosed in U.S. patent application Ser. No. 09/413,532, entitled "Warming System and Method for Heating Various Items Utilized in Surgical Procedures" and filed Oct. 6, 1999, the disclosure of which is incorporated herein by reference in its entirety. The top, side, front, rear and bottom panels are each substantially rectangular and define a cabinet interior wherein various medical or other items may be heated. Warmer unit 90 includes a compartment 25 that is controlled by a corresponding process controller (not shown) to maintain a desired heating (i.e., temperature) range, whereby the compartment may be set and maintained at a desired temperature as described below. A series of substantially rectangular slots 11 are disposed toward the corners of top panel 96, while a plurality of substantially rectangular feet or tabs 17 extend from the proximity of the corners of bottom panel 94. Slots 11 include dimensions slightly larger than feet 17 to enable feet 17 of warmer unit 90 to be inserted within slots 11 of a warmer unit disposed below warmer unit 90. This enables warmer units to be arranged in stack relation to form warming systems or cabinets having a plurality of warmer units.

Front panel 95 includes a power switch 27 and a temperature controller holder 26 typically disposed toward the upper portion of a front panel edge (e.g., the upper portion of a front panel rightmost edge as viewed in FIG. 14). Power switch 27 enables power to the controller and a fan disposed within the warmer unit to direct heated air into the compartment to attain the desired temperature. Front panel 95 further includes a door 28 that enables access to compartment 25. A substantially rectangular window 29, typically constructed of clear polycarbonate or other transparent material, is disposed on the door and includes dimensions slightly less than the door dimensions. The door is preferably connected to front panel 95 via hinges (not shown) disposed toward the door upper edges that enables the door to pivot upwards toward top panel 96. Further, door 28 includes a handle 31 disposed below window 29 and extending along a window bottom edge. Door 28 is typically manipulated to an open position to enable a warmer unit tray or drawer 37 to access the compartment, whereby the drawer contains medical items (e.g., solution bag 3) to be heated by the warmer unit. Temperature stand 53 may be attached to side wall 92 via any suitable or conventional techniques to receive an item for temperature measurement. The item may be thermally treated within system 90 and subsequently removed for placement within the stand. The stand measures and displays the item temperature as described above.

Figure 15:
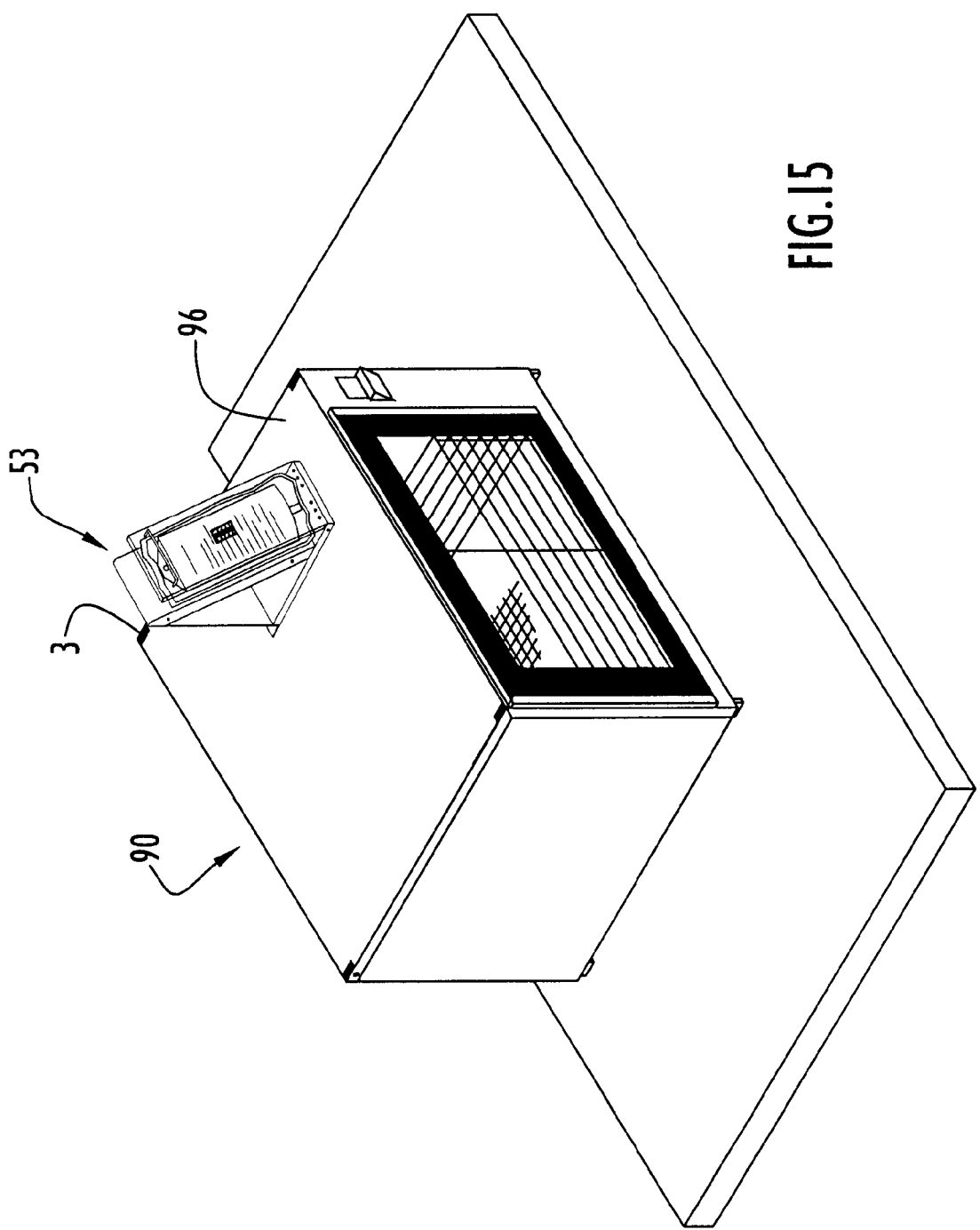
FIG. 15 is a view in perspective of the temperature stand of FIG. 9 disposed on a warming system top surface according to the present invention.
Figure 16:
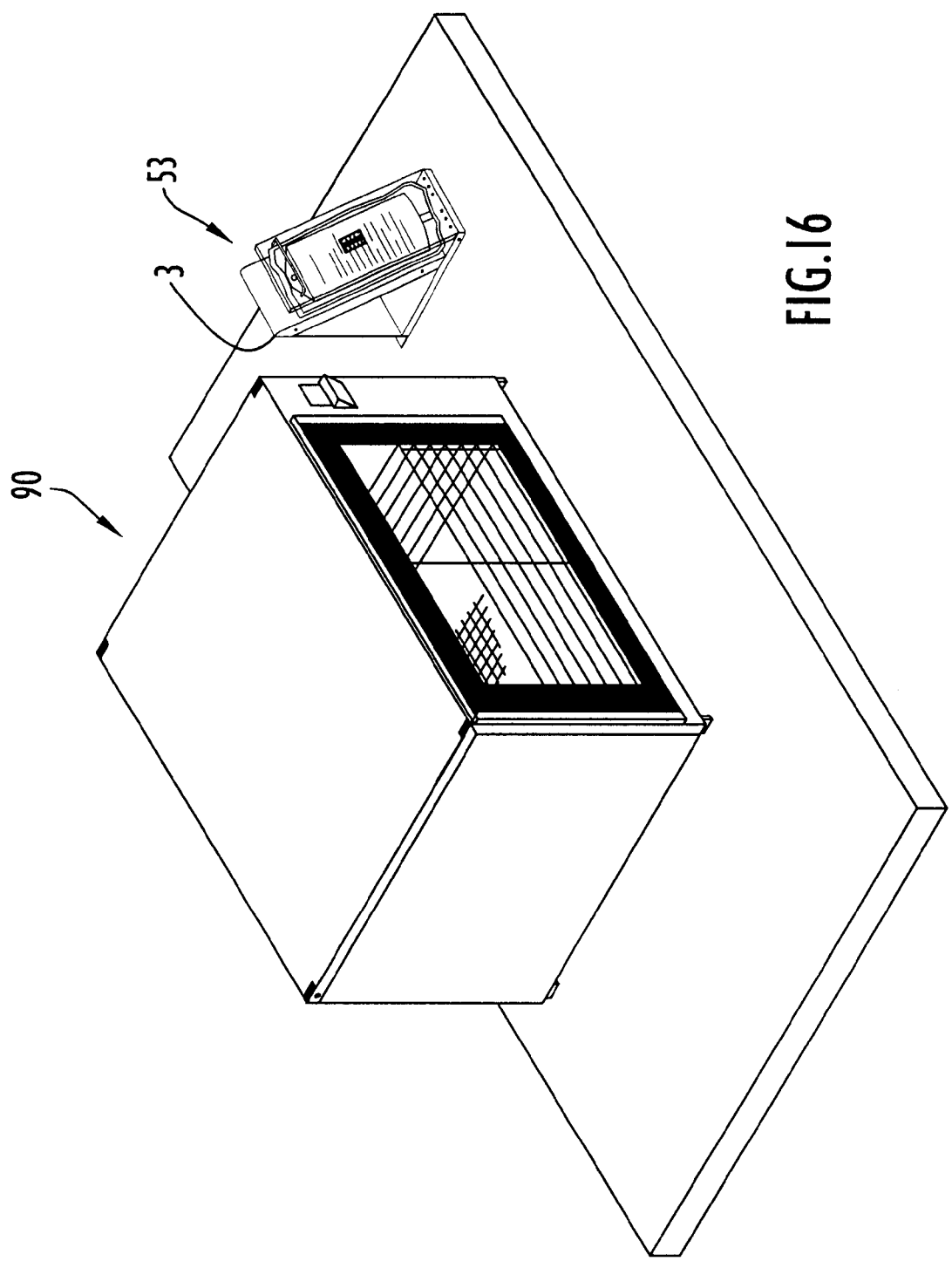
FIG. 16 is a view in perspective of the temperature stand of FIG. 9 operating as a stand-alone unit and disposed proximate a warming system according to the present invention.

The stand may be alternatively disposed on the warmer unit at any suitable locations, such as top panel 96 as illustrated in FIG. 15. Further, the stand may be utilized as a stand-alone unit and be placed at any suitable location, preferably proximate the warmer unit as illustrated in FIG. 16.

Operation of the warmer unit and temperature stand is described with reference to FIGS. 14–16. Specifically, various medical items, such as intravenous or irrigation fluids, blood, instruments or drugs, are selected to be placed within warmer unit 90. Door 28 is manipulated to an open position whereby a drawer may be retrieved from or inserted (e.g., if no drawer is present) into the compartment. The medical items, such as solution bag 3, are inserted into the drawer and the drawer is placed into the compartment with the compartment door subsequently manipulated to a closed position. Power switch 27 is actuated to enable heating of the compartment. The controller is manipulated via display buttons to maintain the compartment at a desired temperature, and further displays the current compartment temperature. The drawer is retrieved from the compartment and the items are removed from the drawer for placement in stand 53. The stand measures and displays the item temperature as described above. When the item reaches an acceptable temperature, the item is removed from the stand for use. Otherwise, the item is returned to the warmer unit for further thermal treatment. The process is repeated until the item attains a desired temperature. In addition, the stand may be utilized to measure and display items not treated by the warmer unit.

It is to be understood that the temperature plate and/or receptacle may be utilized with the warmer unit in substantially the same manner described above. Further, the stand, plate or receptacle may be attached to or disposed proximate any type of thermal treatment system to measure and display item temperature, such as systems of the types disclosed in the above-mentioned patent applications and U.S. Pat. No. 5,924,289 (Bishop, II), the disclosure of which is incorporated herein by reference in its entirety. Alternatively, thermal treatment systems may treat the intravenous solution bags and/or bottles described above having temperature sensing strips to enable thermal treatment systems with or without temperature display capability to provide an indication of the temperature of the bag or bottle contents during treatment.

It will be appreciated that the embodiments described above and illustrated in the drawings represent only a few of the many ways of implementing a method and apparatus for monitoring temperature of intravenously delivered fluids and other medical items.

The intravenous solution bags and medical bottles may contain any sterile intravenous fluid, such as saline solution, blood, antibiotics or other drugs, utilized for operating room procedures, administration to patients in rooms, storage and/or administration from portable units or any other application. The intravenous solution bags and medical bottles may be of any shape or size, may be constructed of any suitable materials and may be suspended from any suitable structures via any securing mechanisms. The intravenous solution bags and bottles may further be implemented by any type of container capable of storing solutions or other medical items. The laminated layer may be of any shape or size, may be constructed of any suitable materials, and may be attached to the intravenous solution bag via any conventional or other fastening techniques. The liner may be of any shape or size suitable to encase the intravenous solution bag, may be constructed of any suitable materials, and may be sealed via any conventional or other sealing techniques. Alternatively, the liner may be constructed to enable the solution bag conduits to interface an intravenous tube without having to open the liner.

The temperature sensing strip may be implemented by any conventional or other types of temperature strips. The temperature sensing strip may be of any shape or size, may sense any desired temperatures, and may include any type of indicators (e.g., alphanumeric or other characters) arranged in any fashion and representing any temperature intervals or other information for any desired temperature range. The temperature strip may utilize any color scheme to illuminate the indicators or to indicate whether or not the solution temperature is within particular ranges (e.g., above, within, or below a particular temperature range). The temperature strip may be attached to, formed integral with, or further serve as a label for any type of medical item or container (e.g., blankets, instruments, intravenous solution bag, bottle, drugs/antibiotics, etc.). Any quantity of temperature strips may be disposed on, attached to or formed integral with the intravenous solution bag, liner, medical bottle, medical bottle label, pressurized infusion system components (e.g., infusion cuff, solution bag receptacle, intravenous tube, etc.), thermal treatment system or any other medical item or system at any location having sufficient proximity to the item being measured via any conventional or other fastening techniques. Medical items having the strip attached thereto may be utilized in any type of system (e.g., thermal treatment system, infusion system, etc.) to provide a temperature indication of the medical item.

The temperature stand and its components (e.g., base, front panel, item and rear supports, etc.) may be of any shape or size, and may be constructed of any suitable materials. The temperature sensing device may be implemented by any quantity of the devices or mechanisms described above, either individually or in any combination, and may be disposed at any location on the stand having sufficient proximity to the item being measured. The front panel or other components supporting the temperature strip may have any portions thereof sufficiently transparent or translucent to enable viewing of the strip through those components. The stand may include any quantity of temperature sensing devices, and may accommodate any quantity or types of medical or other items. The stand may be adjusted or configured in any manner to accommodate medical items of any shape or size. The stand may include any type of handle or other gripping device disposed at any suitable location. The stand may operate as a stand-alone unit and be placed at any desired location, or may be mounted to any system or supporting structure at any suitable location via any conventional or other fastening techniques. The front panel and item support may be tilted at any desired angle, where the tilting angles of the front panel and item support may be the same or different. The stand may be oriented in any desired fashion to measure and display temperature of an item.

The temperature plate and its components (e.g., base, securing member, etc.) may be of any shape or size, and may be constructed of any suitable materials. The securing member may be attached to the base via a hinge or other pivoting type mechanism and/or a lock mechanism to enable pivoting and locking of the securing member to secure a medical item within the plate. The temperature sensing device may be implemented by any quantity of the devices or mechanisms described above, either individually or in any combination, and may be disposed at any location on the plate having sufficient proximity to the item being measured. The securing member or other components supporting the temperature strip may have any portions thereof sufficiently transparent or translucent to enable viewing of the strip through those components. The plate may include any quantity of temperature sensing devices, and may accommodate any quantity or types of medical or other items. The plate may be adjusted or configured in any manner to accommodate medical items of any shape or size. The plate may operate as a stand-alone unit and be placed at any desired location, or may be mounted to any system or supporting structure at any suitable location via any conventional or other fastening techniques. The plate may be oriented in any desired fashion to measure and display temperature of an item.

The temperature receptacle and its components (e.g., front, rear, bottom and side walls, etc.) may be of any shape or size, and may be constructed of any suitable materials. The temperature sensing device may be implemented by any quantity of the devices or mechanisms described above, either individually or in any combination, and may be disposed at any location on the receptacle having sufficient proximity to the item being measured. The front wall or other components supporting the temperature strip may have any portions thereof sufficiently transparent or translucent to enable viewing of the strip through those components. The receptacle may include any quantity of temperature sensing devices, and may accommodate any quantity or types of medical or other items. The receptacle may be adjusted or configured in any manner to accommodate medical items of any shape or size. The receptacle may operate as a stand-alone unit and may be placed at any desired location, or may be mounted to any system or supporting structure at any suitable location via any conventional or other fastening techniques. The receptacle may be oriented in any desired fashion to measure and display temperature of an item.

It is to be understood that the terms "top", "bottom", "upper", "lower", "right", "left", "vertical", "horizontal", "length", "width", "height", "thickness", "front", "back", "rear", "side" and the like are used herein merely to describe points of reference and do not limit the present invention to any specific configuration or orientation.

The temperature sensing device may alternatively be implemented by any type of temperature measuring device (e.g., preferably those capable of measuring temperature without directly contacting container contents) and/or display. For example, the temperature sensing device may be implemented by a temperature sensor in combination with a liquid crystal display (LCD) to measure and display item temperature. This mechanism may include a battery and operate on direct current (DC) voltage, and/or include a power cord for connection to a common wall outlet jack and utilize alternating current (AC). Further, the temperature sensing device may be implemented by a temperature sensor and a voice or speech synthesizer to indicate temperature or to specify that an item is below or exceeds a predetermined temperature (e.g., provide an audio indication, such as "too hot", "too cold", etc.). Moreover, the temperature sensing device may employ an analog or infrared temperature sensor, or devices measuring temperature via sound, ultrasonic or other waves, and convey that temperature in any of the manners described above. In addition, the temperature sensing device may be implemented by any of the above temperature sensing strips and/or mechanisms individually or in any combination to measure and display item temperatures, and may be utilized with any of the above-described or other devices, systems or structures.

It is to be understood that the present invention is not limited to the specific applications, items or embodiments disclosed herein, but pertains to any temperature sensing device or structure that receives an intravenous solution bag, medical bottle or other article containing a solution, or any other medical or non-medical item and provides a visual or other indication of item temperature for administration, thermal treatment or other application of the item.

From the foregoing description, it will be appreciated that the invention makes available a novel method and apparatus for monitoring temperature of intravenously delivered fluids and other medical items wherein temperature sensing devices may be attached to medical items and/or structures to measure and provide a visual indication of medical item temperature.

Having described preferred embodiments of a new and improved method and apparatus for monitoring temperature of intravenously delivered fluids and other medical items, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A temperature control system for heating medical items to desired temperatures comprising:

a system housing;

a heating chamber disposed within said housing for receiving at least one medical item and heating said at least one medical item to a desired temperature, wherein said heating chamber includes:
- at least one receptacle each for receiving a corresponding medical item and heating said corresponding medical item to said desired temperature;
- at least one temperature sensor assembly each associated with a corresponding receptacle to measure and visually indicate a temperature of a medical item disposed within that receptacle, wherein each temperature sensor assembly includes a temperature sensor disposed in said corresponding receptacle in thermal relation with said medical item in that receptacle to directly measure medical item temperature; and
- a heater for applying heat to said at least one receptacle; and a controller to facilitate entry of said desired temperature for said heating chamber and to control said heater to heat said at least one medical item to said desired temperature.

2. A temperature control system for heating medical items to desired temperatures comprising:

a system housing;

a heating chamber disposed within said housing for receiving at least one medical item and heating said at least one medical item to a desired temperature, wherein said heating chamber includes:
- at least one receptacle each for receiving a corresponding medical item and heating said corresponding medical item to said desired temperature;
- a temperature sensor disposed in each receptacle in thermal relation with and for providing a temperature indication of a corresponding medical item, wherein said temperature sensor includes a plurality of temperature sensitive substances each associated with a corresponding temperature range, and wherein each said substance is responsive to a temperature of said corresponding medical item and provides a visual indication of said medical item temperature when said medical item temperature is within said corresponding temperature range; and
- a heater for applying heat to said at least one receptacle; and a controller to facilitate entry of said desired temperature for said heating chamber and to control said heater to heat said at least one medical item to said desired temperature.

3. The system of claim 2 wherein said temperature sensor includes a temperature sensing strip providing a digital indication of said medical item temperature.

* * * * *